(12) United States Patent
Pirjaberi et al.

(10) Patent No.: US 11,208,964 B2
(45) Date of Patent: *Dec. 28, 2021

(54) ENGINE TORQUE SMOOTHING

(71) Applicant: Tula Technology, Inc., San Jose, CA (US)

(72) Inventors: Mohammad R. Pirjaberi, San Jose, CA (US); Kian Eisazadeh-Far, Berkeley, CA (US); Steven E. Carlson, Oakland, CA (US); Louis J. Serrano, Los Gatos, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,309

(22) Filed: Aug. 25, 2020

(65) Prior Publication Data

US 2020/0386176 A1 Dec. 10, 2020

Related U.S. Application Data

(63) Continuation of application No. 16/278,075, filed on Feb. 16, 2019, now Pat. No. 10,787,979, which is a
(Continued)

(51) Int. Cl.
*F02D 41/00* (2006.01)
*F02D 41/30* (2006.01)
*F02D 41/14* (2006.01)

(52) U.S. Cl.
CPC ..... *F02D 41/0087* (2013.01); *F02D 41/0002* (2013.01); *F02D 41/1498* (2013.01);
(Continued)

(58) Field of Classification Search
CPC .. F02D 41/00; F02D 41/0087; F02D 41/0002; F02D 41/1498; F02D 41/3058;
(Continued)

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

| CN | 101298249 | 9/2012 |
| CN | 102060014 | 4/2014 |

(Continued)

OTHER PUBLICATIONS

International Search Report and Written Opinion dated Nov. 27, 2017 from International Application No. PCT/US2017/047650.
(Continued)

*Primary Examiner* — Hieu T Vo
(74) *Attorney, Agent, or Firm* — Beyer Law Group LLP

(57) ABSTRACT

Methods, devices, estimators, controllers and algorithms are described for estimating the torque profile of an engine and/or for controlling torque applied to a powertrain by one or more devices other than the engine itself to manage the net torque applied by the engine and other device(s) in manners that reduce undesirable NVH. The described approaches are particularly well suited for use in hybrid vehicles in which the engine is operated in a skip fire or other dynamic firing level modulation manner—however they may be used in a variety of other circumstances as well. In some embodiments, the hybrid vehicle includes a motor/generator that applies the smoothing torque.

24 Claims, 15 Drawing Sheets

Related U.S. Application Data continuation of application No. 16/038,622, filed on Jul. 18, 2018, now Pat. No. 10,436,133, which is a continuation of application No. 15/679,462, filed on Aug. 17, 2017, now Pat. No. 10,060,368, which is a continuation-in-part of application No. 15/340,291, filed on Nov. 1, 2016, now Pat. No. 10,221,786, which is a continuation of application No. 14/992,779, filed on Jan. 11, 2016, now Pat. No. 9,512,794.

(60) Provisional application No. 62/379,357, filed on Aug. 25, 2016, provisional application No. 62/137,539, filed on Mar. 24, 2015, provisional application No. 62/102,206, filed on Jan. 12, 2015.

(52) U.S. Cl.
CPC ....... *F02D 41/307* (2013.01); *F02D 41/3058* (2013.01); *F02D 2041/0012* (2013.01); *Y02T 10/40* (2013.01)

(58) Field of Classification Search
CPC . F02D 41/307; F02D 2041/0012; Y02T 10/40
See application file for complete search history.

(56) References Cited

U.S. PATENT DOCUMENTS

| | | |
|---|---|---|
| 4,509,488 A | 4/1985 | Forster et al. |
| 4,699,097 A | 10/1987 | Tanaka et al. |
| 5,020,491 A | 6/1991 | Mashino |
| 5,377,631 A | 1/1995 | Schechter |
| 5,461,289 A | 10/1995 | Adler et al. |
| 5,568,795 A | 10/1996 | Robichaux et al. |
| 5,806,617 A | 9/1998 | Yamaguchi |
| 5,853,306 A | 12/1998 | Worth et al. |
| 6,085,723 A | 7/2000 | Pels et al. |
| 6,149,544 A | 11/2000 | Masberg et al. |
| 6,158,411 A | 12/2000 | Morikawa |
| 6,232,733 B1 | 5/2001 | Obayashi et al. |
| 6,307,276 B1 | 10/2001 | Bader |
| 6,364,807 B1 | 4/2002 | Koneda et al. |
| 6,405,701 B1 | 6/2002 | Masberg et al. |
| 6,408,625 B1 | 6/2002 | Woon et al. |
| 6,438,944 B1 | 8/2002 | Bidner et al. |
| 6,441,506 B2 | 8/2002 | Nakashima |
| 6,464,028 B1 | 10/2002 | Imani |
| 6,478,705 B1 | 11/2002 | Holmes et al. |
| 6,487,998 B1 | 12/2002 | Masberg et al. |
| 6,588,392 B2 | 7/2003 | Armstrong et al. |
| 6,591,200 B1 | 7/2003 | Cohen et al. |
| 6,619,258 B2 | 9/2003 | McKay et al. |
| 6,691,807 B1 | 2/2004 | Bhavsar et al. |
| 6,692,404 B2 | 2/2004 | Matsubara et al. |
| 6,740,002 B1 | 5/2004 | Stridsberg |
| 6,746,366 B2 | 6/2004 | Tamor |
| 6,886,524 B2 | 5/2005 | Hanada et al. |
| 6,943,460 B2 | 9/2005 | Wakashiro et al. |
| 6,986,399 B2 | 1/2006 | Bhavsar et al. |
| 7,021,409 B2 | 4/2006 | Tamor |
| 7,058,487 B2 | 6/2006 | Hara et al. |
| 7,063,062 B2 | 6/2006 | Lewis et al. |
| 7,066,136 B2 | 6/2006 | Ogiso |
| 7,086,386 B2 | 8/2006 | Doering |
| 7,104,244 B2 | 9/2006 | Nishi et al. |
| 7,154,236 B1 | 12/2006 | Heap |
| 7,198,029 B1 | 4/2007 | Wong et al. |
| 7,225,782 B2 | 6/2007 | Pallett et al. |
| 7,232,401 B2 | 6/2007 | Albertson |
| 7,275,518 B1 | 10/2007 | Gartner et al. |
| 7,278,392 B2 | 10/2007 | Zillmer et al. |
| 7,350,499 B2 | 4/2008 | Takaoka et al. |
| 7,377,250 B1 | 5/2008 | Duffy |
| 7,456,509 B2 | 11/2008 | Gray, Jr. |
| 7,503,312 B2 | 3/2009 | Surnilla et al. |
| 7,523,734 B2 | 4/2009 | Albertson et al. |
| 7,530,413 B2 | 5/2009 | Rayl |
| 7,577,511 B1 | 8/2009 | Tripathi et al. |
| 7,580,779 B2 | 8/2009 | Zillmer et al. |
| 7,930,087 B2 | 4/2011 | Gibson et al. |
| 7,996,145 B2 | 8/2011 | Snyder |
| 8,015,960 B2 | 9/2011 | Watanabe |
| 8,099,224 B2 | 1/2012 | Tripathi et al. |
| 8,335,634 B2 | 12/2012 | Kang et al. |
| 8,464,690 B2 | 6/2013 | Yuille et al. |
| 8,532,828 B2 | 9/2013 | Schramm et al. |
| 8,626,411 B2 | 1/2014 | Whitney et al. |
| 8,715,136 B1 | 5/2014 | Dai et al. |
| 8,847,426 B2 | 9/2014 | Heap et al. |
| 8,869,773 B2 | 10/2014 | Tripathi et al. |
| 8,880,258 B2 | 11/2014 | Breton et al. |
| 8,892,330 B2 | 11/2014 | Yuille et al. |
| 9,086,020 B2 | 7/2015 | Tripathi et al. |
| 9,120,478 B2 | 9/2015 | Carlson et al. |
| 9,239,037 B2 | 1/2016 | Carlson et al. |
| 9,249,748 B2 | 2/2016 | Verner |
| 9,267,454 B2 | 2/2016 | Wilcutts et al. |
| 9,328,672 B2 | 5/2016 | Serrano et al. |
| 9,399,963 B2 | 7/2016 | Loucks et al. |
| 9,399,964 B2 | 7/2016 | Younkins et al. |
| 9,512,794 B2 | 12/2016 | Serrano et al. |
| 9,562,470 B2 | 2/2017 | Younkins et al. |
| 9,581,097 B2 | 2/2017 | Younkins et al. |
| 9,650,971 B2 | 5/2017 | Pirjaberi et al. |
| 9,664,130 B2 | 5/2017 | Wilcutts et al. |
| 9,745,905 B2 | 8/2017 | Pirjaberi et al. |
| 9,777,658 B2 | 10/2017 | Nagashima et al. |
| 9,784,644 B2 | 10/2017 | Chen et al. |
| 9,790,867 B2 | 10/2017 | Carlson et al. |
| 9,803,543 B2 | 10/2017 | Werke et al. |
| 9,890,732 B2 | 2/2018 | Younkins et al. |
| 9,926,868 B2 | 3/2018 | Serrano et al. |
| 9,981,652 B2 | 5/2018 | Kim et al. |
| 10,012,161 B2 | 7/2018 | Shost et al. |
| 10,024,289 B2 | 7/2018 | Leamy et al. |
| 10,060,368 B2 | 8/2018 | Pirjaberi et al. |
| 10,221,786 B2 | 3/2019 | Serrano et al. |
| 10,436,133 B2 | 10/2019 | Pirjaberi et al. |
| 10,549,744 B2* | 2/2020 | Doering ................ F02D 41/123 |
| 10,787,979 B2* | 9/2020 | Pirjaberi ............. F02D 41/3058 |
| 10,830,166 B2 | 11/2020 | Serrano et al. |
| 2003/0213467 A1 | 11/2003 | Rayl et al. |
| 2004/0012206 A1 | 1/2004 | Wakashiro et al. |
| 2004/0140139 A1 | 7/2004 | Malik |
| 2004/0174124 A1 | 9/2004 | Lee |
| 2005/0038576 A1 | 2/2005 | Hara et al. |
| 2005/0051133 A1 | 3/2005 | Persson et al. |
| 2005/0055152 A1 | 3/2005 | Wakashiro et al. |
| 2005/0119805 A1 | 6/2005 | Bischoff |
| 2005/0161023 A1 | 7/2005 | Albertson et al. |
| 2005/0164826 A1 | 7/2005 | Albertson |
| 2005/0189894 A1 | 9/2005 | Komiyama et al. |
| 2005/0261817 A1 | 11/2005 | Koenig et al. |
| 2006/0086546 A1 | 4/2006 | Hu et al. |
| 2006/0173590 A1 | 8/2006 | Zillmer et al. |
| 2006/0234829 A1 | 10/2006 | Berger et al. |
| 2007/0042861 A1 | 2/2007 | Takaoka et al. |
| 2007/0056533 A1 | 3/2007 | Reed et al. |
| 2007/0113541 A1 | 5/2007 | Jankovic |
| 2007/0131196 A1 | 6/2007 | Gibson et al. |
| 2007/0219702 A1 | 9/2007 | Kishimoto |
| 2007/0261656 A1 | 11/2007 | Albertson et al. |
| 2008/0078593 A1 | 4/2008 | Ortmann et al. |
| 2008/0154468 A1 | 6/2008 | Berger et al. |
| 2008/0191492 A1 | 8/2008 | Savant et al. |
| 2009/0084618 A1 | 4/2009 | Thompson et al. |
| 2009/0105896 A1 | 4/2009 | Tamai et al. |
| 2009/0145381 A1 | 6/2009 | Watanabe |
| 2009/0205888 A1 | 8/2009 | Steuernagel et al. |
| 2009/0241911 A1 | 10/2009 | Fox et al. |
| 2010/0010724 A1 | 1/2010 | Tripathi et al. |
| 2010/0050993 A1 | 3/2010 | Zhao et al. |
| 2010/0305797 A1 | 12/2010 | Jiang |
| 2011/0088659 A1 | 4/2011 | Wang et al. |

(56) References Cited

U.S. PATENT DOCUMENTS

| | | |
|---|---|---|
| 2011/0130902 A1 | 6/2011 | Heisel et al. |
| 2011/0144838 A1 | 6/2011 | Matthews et al. |
| 2011/0153128 A1 | 6/2011 | Wright et al. |
| 2011/0276251 A1 | 11/2011 | Kang et al. |
| 2011/0284336 A1 | 11/2011 | Soller et al. |
| 2012/0010792 A1 | 1/2012 | Nedorezov et al. |
| 2012/0031357 A1 | 2/2012 | Ervin et al. |
| 2012/0035793 A1 | 2/2012 | Kang et al. |
| 2012/0073929 A1 | 3/2012 | Grutter et al. |
| 2012/0078456 A1 | 3/2012 | Hakumura et al. |
| 2012/0109495 A1 | 5/2012 | Tripathi et al. |
| 2012/0191316 A1 | 7/2012 | Leone et al. |
| 2012/0221217 A1 | 8/2012 | Sujan et al. |
| 2013/0333655 A1 | 12/2013 | Schwenke et al. |
| 2014/0041625 A1 | 2/2014 | Pirjaberi et al. |
| 2014/0041626 A1 | 2/2014 | Wilcutts et al. |
| 2014/0046558 A1 | 2/2014 | Kim |
| 2014/0048023 A1 | 2/2014 | Ervin et al. |
| 2014/0100733 A1 | 4/2014 | Christ |
| 2014/0109720 A1 | 4/2014 | Werner et al. |
| 2014/0148304 A1 | 5/2014 | Pietron et al. |
| 2014/0163839 A1 | 6/2014 | Staley et al. |
| 2014/0172209 A1 | 6/2014 | Ide |
| 2014/0222261 A1 | 8/2014 | Kato |
| 2014/0251282 A1 | 9/2014 | Kotwicki et al. |
| 2014/0288755 A1 | 9/2014 | Murakami |
| 2014/0364273 A1 | 12/2014 | Martin |
| 2015/0100221 A1 | 4/2015 | Routledge et al. |
| 2015/0260117 A1 | 9/2015 | Shost et al. |
| 2016/0032869 A1 | 2/2016 | Boyer et al. |
| 2016/0040614 A1 | 2/2016 | Younkins et al. |
| 2016/0053697 A1 | 2/2016 | Pirjaberi et al. |
| 2016/0102620 A1 | 4/2016 | Ervin et al. |
| 2016/0107633 A1 | 4/2016 | Liang et al. |
| 2016/0108798 A1 | 4/2016 | VanDerWege |
| 2016/0116371 A1 | 4/2016 | Chen et al. |
| 2016/0222899 A1 | 8/2016 | Glugla |
| 2016/0281618 A1 | 9/2016 | Younkins et al. |
| 2017/0051689 A1 | 2/2017 | Serrano et al. |
| 2017/0089281 A1 | 3/2017 | Ujihara et al. |
| 2017/0130630 A1 | 5/2017 | Younkins et al. |
| 2017/0234253 A1 | 8/2017 | Serrano et al. |
| 2017/0291596 A1 | 10/2017 | Tsukada et al. |
| 2017/0306864 A1 | 10/2017 | Pirjaberi et al. |
| 2017/0321617 A1 | 11/2017 | Kalluri et al. |
| 2017/0342920 A1 | 11/2017 | Pirjaberi et al. |
| 2017/0342921 A1 | 11/2017 | Pirjaberi et al. |
| 2017/0342922 A1 | 11/2017 | Pirjaberi et al. |
| 2017/0370342 A1 | 12/2017 | Nagashima et al. |
| 2018/0251116 A1 | 9/2018 | Cho et al. |
| 2018/0257635 A1 | 9/2018 | Meyer et al. |
| 2018/0320615 A1 | 11/2018 | Pirjaberi et al. |
| 2019/0003443 A1 | 1/2019 | Ortiz-Soto et al. |
| 2019/0178180 A1 | 6/2019 | Pirjaberi et al. |

FOREIGN PATENT DOCUMENTS

| | | |
|---|---|---|
| CN | 102233876 | 5/2014 |
| CN | 102817722 | 5/2015 |
| CN | 103332193 | 11/2015 |
| CN | 103711594 | 6/2016 |
| CN | 103711595 | 1/2017 |
| CN | 104204473 | 2/2017 |
| DE | 19532163 | 3/1997 |
| DE | 19532164 | 3/1997 |
| DE | 11 2013 004 033 | 5/2015 |
| JP | H09222034 | 8/1997 |
| JP | 11-022504 | 1/1999 |
| WO | WO 2010/006311 | 1/2010 |
| WO | WO 2011/085383 | 7/2011 |
| WO | WO 2014/028344 | 2/2014 |

OTHER PUBLICATIONS

International Search Report and Written Opinion dated Jun. 11, 2018 from International Application No. PCT/US18/21995.

Chinese Office Action dated Jul. 31, 2018 from Chinese Application No. 201680005420.6.

German Office Action dated Sep. 18, 2018 from German Application No. 11 2016 000 318.8.

Japanese Office Action dated Dec. 12, 2018 from Japanese Application No. 2017-536544.

Chinese Office Action dated Jul. 26, 2021 from Chinese Application No. 20178005142.9.

Chinese Notification to go Through Formalities of Registration dated Sep. 28, 2021 from Chinese Application No. 201780051492.9.

* cited by examiner

ENGINE TORQUE SMOOTHING

CROSS REFERENCE TO RELATED APPLICATIONS

This application is a Continuation of U.S. application Ser. No. 16/278,075 filed Feb. 16, 2019, which is a Continuation of U.S. application Ser. No. 16/038,622, filed on Jul. 18, 2018 (now U.S. Pat. No. 10,436,133, issued Oct. 8, 2019), which is a Continuation of U.S. application Ser. No. 15/679,462, filed on Aug. 17, 2017 (now U.S. Pat. No. 10,060,368, issued on Aug. 28, 2018), which claims priority of U.S. Provisional Patent Application No. 62/379,357, filed Aug. 25, 2016. U.S. application Ser. No. 15/679,462 is also a Continuation-in-Part of U.S. application Ser. No. 15/340,291, filed on Nov. 1, 2016 (now U.S. Pat. No. 10,221,786, issued Mar. 5, 2019), which is a Continuation of U.S. application Ser. No. 14/992,779, filed on Jan. 11, 2016 (now U.S. Pat. No. 9,512,794, issued on Dec. 6, 2016). U.S. application Ser. No. 14/992,779 claims priority of U.S. Provisional Patent Application Nos. 62/102,206, filed on Jan. 12, 2015, and 62/137,539, filed on Mar. 24, 2015. Each of these referenced priority applications are incorporated herein by reference.

FIELD OF THE INVENTION

The present invention relates generally to hybrid vehicles powered by internal combustion engines operating under skip-fire control having another source of power in addition to the internal combustion engine. The torque profile of the skip-fire controlled engine is estimated and the additional source of power is used to smooth the torque profile.

BACKGROUND

Fuel efficiency of internal combustion engines can be substantially improved by varying the displacement of the engine. This allows for the full torque to be available when required, yet can significantly reduce pumping losses and improve thermal efficiency by using a smaller displacement when full torque is not required. The most common method today of implementing a variable displacement engine is to deactivate a group of cylinders substantially simultaneously. In this approach the intake and exhaust valves associated with the deactivated cylinders are kept closed and no fuel is injected when it is desired to skip a combustion event. For example, an 8 cylinder variable displacement engine may deactivate half of the cylinders (i.e. 4 cylinders) so that it is operating using only the remaining 4 cylinders. Commercially available variable displacement engines available today typically support only two or at most three displacements.

Another engine control approach that varies the effective displacement of an engine is referred to as "skip-fire" engine control. In general, skip-fire engine control contemplates selectively skipping the firing of certain cylinders during selected firing opportunities. Thus, a particular cylinder may be fired during one engine cycle and then may be skipped during the next engine cycle and then selectively skipped or fired during the next. In this manner, even finer control of the effective engine displacement is possible. For example, firing every third cylinder in a 4 cylinder engine would provide an effective displacement of $\frac{1}{3}^{rd}$ of the full engine displacement, which is a fractional displacement that is not obtainable by simply deactivating a set of cylinders.

U.S. Pat. No. 8,131,445 (which is incorporated herein by reference) teaches a skip-fire operational approach, which allows any fraction of the cylinders to be fired on average using individual cylinder deactivation. In other skip-fire approaches a particular firing sequence or firing density may be selected from a set of available firing sequences or fractions. In a skip-fire operational mode the amount of torque delivered generally depends heavily on the firing density, or fraction of combustion events that are not skipped. Dynamic skip fire (DSF) control refers to skip-fire operation where the fire/skip decisions are made in a dynamic manner, for example, at every firing opportunity, every engine cycle, or at some other interval.

In some applications referred to as multi-level skip fire, individual working cycles that are fired may be purposely operated at different cylinder outputs levels—that is, using purposefully different air charge and corresponding fueling levels. By way of example, U.S. Pat. No. 9,399,964 (which is incorporated herein by reference) describes some such approaches. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. It should be appreciated that dynamic firing level engine operation is different than conventional variable displacement in which when the engine enters a reduced displacement operational state, a defined set of cylinders are operated in generally the same manner until the engine transitions to a different operational state.

The combustion process and the firing of cylinders using skip fire or other firing level modulation techniques can introduce unwanted noise, vibration and harshness (NVH). For example, the engine can transfer vibration to the body of the vehicle, where it may be perceived by vehicle occupants. Sounds may also be transmitted through the chassis into the vehicle cabin. Under certain operating conditions, the firing of cylinders generates undesirable acoustic effects through the exhaust system and tailpipe. Vehicle occupants may thus experience undesirable NVH from structurally transmitted vibrations or air transmitted sounds.

A challenge with skip fire engine control is obtaining acceptable NVH performance. While prior approaches work well, there are continuing efforts to develop new and improved approaches for managing NVH during firing level modulation operation of an engine.

SUMMARY

A variety of methods, devices, estimators, controllers and algorithms are described for estimating the torque profile of an engine and/or for controlling torque applied to a powertrain by one or more devices other than the engine itself to manage the net torque applied by the engine and other device(s) in manners that reduce undesirable NVH. The described approaches are particularly well suitable for use in hybrid vehicles in which the engine is operated in a skip fire or other dynamic firing level modulation manner—however they may be used in a variety of other circumstances as well.

In some embodiments, the hybrid vehicle includes a motor/generator that applies the smoothing torque.

In some embodiments, periods are identified in which an instantaneous torque or an instantaneous acceleration produced by the engine is expected to exceed a designated threshold. A counteracting torque is then applied to the powertrain in a controlled manner by an energy source or sink during the identified periods such that the expected net powertrain torque does not exceed the designated threshold. In some embodiments, the designated threshold may vary as a function of engine speed and/or transmission gear. In some embodiments, the counteracting (smoothing) torque is applied in short impulses timed to counteract torque spikes generated during skip fire or dynamic firing level modulation operation of the engine.

In some hybrid vehicle embodiments, when an estimated engine torque profile is determined to provide acceptable NVH, the hybrid vehicle is operated solely on the output of the internal combustion engine. However, when the estimated engine torque profile is determined to provide unacceptable NVH, the both the internal combustion engine and an auxiliary power source/sink are utilized, with the auxiliary power source/sink being arranged to provide a smoothing torque to reduce NVH to an acceptable level.

In some embodiments, the overall engine torque profile and the determination of the counteracting smoothing torque is updated each firing opportunity such that need for and magnitude of the counteracting smoothing torque is updated for each firing opportunity.

In some skip fire or other dynamic firing level modulation embodiments, the torque profile estimations are used in the selection of the (effective) operational firing fraction. In such embodiments, the fuel efficiency of various candidate firing fractions may be compared after considering the fuel efficiency implications of any smoothing torques that may be required when operating at the respective firing fractions to meet desired drivability criteria.

In some embodiments, the torque profile for the engine may be determined by summing the contribution of each of the working chambers (e.g. cylinders). In some embodiments, the torque profile for a particular cylinder may be accomplished by selecting or determining a normalized torque profile for the cylinder's operational state and then scaling the normalized torque profile based on current engine operating parameters. During skip fire engine operation, the normalized torque profile utilized will vary based on the skip/fire firing decision for that particular cylinder. In some embodiments, the normalized torque profile will be based at least in part on intake manifold pressure. In some embodiments, the normalized torque profile may be scaled based on one or more current operating parameters such as engine speed, sparking timing, valve timing/lift, engine firing history, cylinder firing history, etc.

In some embodiments, the engine torque profile is filtered to identify selected harmonic components of the torque profile. A counteracting smoothing torque to apply to the powertrain may then be based on the filtered results. In some such embodiments, the filtered results may be amplified based on one or more current engine parameters. The filtered signal may be delayed to align with the torque predicted to be produced by the engine. The amplified filtered signal may be inverted and used in the control of an electric motor/generator to source/sink torque based on the inverted torque signal.

In some embodiments the smoothing torque may be applied as one or more oscillating (e.g. sinusoidal) signal, whereas in others the smoothing torque may be applied as impulses intended to offset portions of expected torque spikes.

In various embodiments, the smoothing torque can effectively be applied by devices that draw energy from the powertrain by increasing or decreasing their respective loads appropriately. Similarly the torque applied by devices that add torque to the powertrain can be increased or decreased to effectively provide the desired smoothing torque. When devices such as a motor/generator that can both add and subtract torque are used, either of these approaches may be used or the devices may be varied between torque contributing and torque drawing states to provide the desired smoothing torque.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
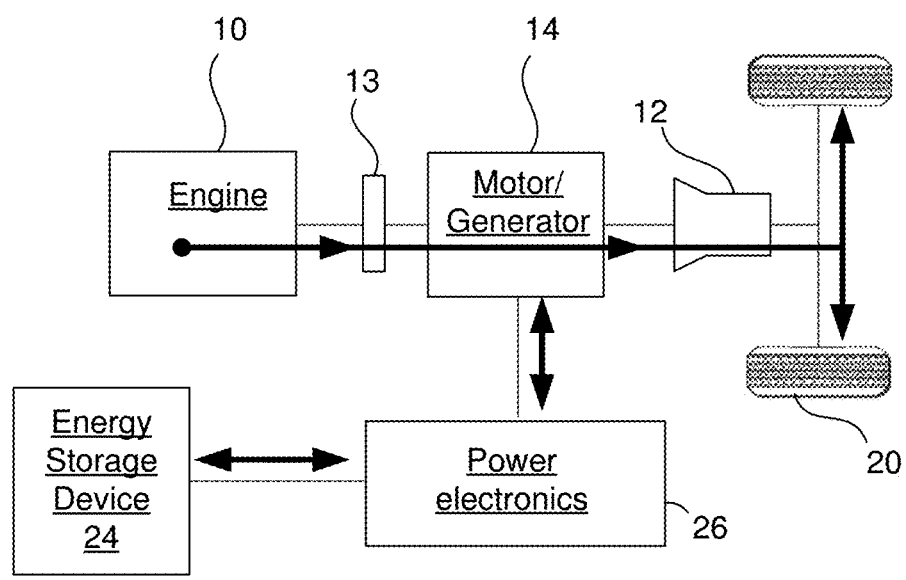
FIG. 1 is a diagrammatic illustration of a representative hybrid powertrain according to an embodiment of the present invention.

The present invention describes methods and systems for reducing NVH and improving fuel efficiency in a hybrid engine using a skip fire or firing level modulation controlled internal combustion engine as one source of power. An auxiliary power source/sink is capable of adding and/or removing torque from the powertrain in a controlled manner that helps reduce engine generated NVH.

Skip fire operation most commonly includes cylinder deactivation whereby intake and exhaust valves are kept closed during the nominal gas exchange phases of a 4-stroke engine cycle. Performing cylinder deactivation requires the engine controller to control power driver outputs that actuate the cylinder deactivation elements. For cam operated valves, cylinder deactivation may be realized by actuating solenoids that operate hydraulic oil control valves, which allow the valve lifters to either remain rigid (a fired cylinder) or collapse (a skipped cylinder). Such a system may be referred to as a "lost-motion" deactivation system. Cylinder deactivation can be achieved using other mechanisms for cam operated valves. Alternatively electromechanical actuators may be used to control the intake and/or the exhaust valves. Independent of the cylinder deactivation method there is a time lag between making a fire/no-fire decision and intake valve opening of a firing cylinder.

The varying and sometimes irregular firing pattern in a skip fire controlled internal combustion engine can lead to unacceptable NVH with some firing patterns. One approach to dealing with such problems is to not use particular firing fractions or firing sequences that are known to produce unacceptable NVH levels. Instead, other firing fractions or firing sequences are used and the cylinder output is adjusted accordingly (e.g., by adjusting the manifold absolute pressure, spark advance, etc.) so that the desired engine output is delivered. These allowed firing fractions are chosen based on their desirable NVH properties, i.e. the NVH produced while operating at these firing fractions is acceptable. Various approaches of this kind are described in co-assigned U.S. patent application Ser. Nos. 13/654,244 and 14/638,908, which are incorporated herein in their entirety for all purposes. Co-assigned U.S. patent application Ser. No. 14/992,779, which is incorporated herein in its entirety for all purposes, describes some systems and methods for integrating an additional power source/sink with a dynamic skip fired controlled engine. Forcing a skip fire engine to operate at only a limited number of firing fractions reduces the fuel efficiency gains that can be realized with skip fire control, since torque control must use other actuators such as spark timing, MAP, and cam. Use of these other actuators to control torque output is generally less fuel efficient than control based exclusively on the firing fraction.

This application describes various control methods in which a second power source/sink, in addition to the internal combustion engine, is operated in a manner that generate a smoothing torque that is applied to a vehicle powertrain. The smoothing torque is any torque that is applied to help cancel out or reduce a variation in torque generated by the internal combustion engine. The smoothing torque can be generated by any suitable energy storage/capture/release device. One example would be an electric motor/generator with a battery and/or capacitor to store and release energy. Alternatively any system or device that stores and captures/releases energy mechanically, pneumatically or hydraulically may be used. For example, a flywheel with a variable mechanical coupling, or a high pressure fluid reservoir with valves controlling fluid flow to and from a turbine or similar device may be used to capture/release energy from a powertrain. The smoothing torque is applied in a manner such that noise and vibration generated by the skip fire firing sequence is at least partially reduced or canceled out.

FIG. 1 schematically illustrates an exemplary hybrid electric vehicle powertrain and associated components that can be used to in conjunction with the present invention. These figures shows a parallel hybrid electric powertrain configuration however, it should be appreciated that the same concepts can be applied to other hybrid powertrains including series hybrid electric configurations, power-split electric configurations and hydraulic hybrid configurations, although the largest improvements in fuel efficiency are expected for the parallel and series electric hybrid configurations.

FIG. 1 show a skip fire controlled engine 10 applying torque to a powertrain drive shaft which is connected to a transmission 12, which in turn drives selected wheels 20 of a vehicle. A motor/generator 14 is also coupled to the powertrain and is capable of either simultaneously generating electrical power (thereby effectively subtracting torque from the drive shaft) or supplementing the engine torque, depending on whether the engine is producing surplus torque or deficit torque relative to a desired powertrain torque output. When the engine produces surplus torque, the surplus torque causes the motor/generator 14 to generate electricity which gets stored in the energy storage device 24, which may be a battery and/or a capacitor, after conditioning by the power electronics 26. The power electronics 26 may include circuitry to convert the output voltage on the energy storage device 24 to a voltage suitable for delivering/receiving power from the motor/generator 14. When the engine produces deficit torque the engine torque is supplemented with torque produced by the motor/generator 14 using energy previously stored in the energy storage device 24. Use of a capacitor as energy storage device 24 may lead to a larger improvement of the overall fuel economy of the vehicle, since it largely avoids the energy losses associated with charging and discharging conventional batteries, which is particularly advantageous when relatively frequent storage and retrieval cycles are contemplated as in the current invention.

Figure 2:
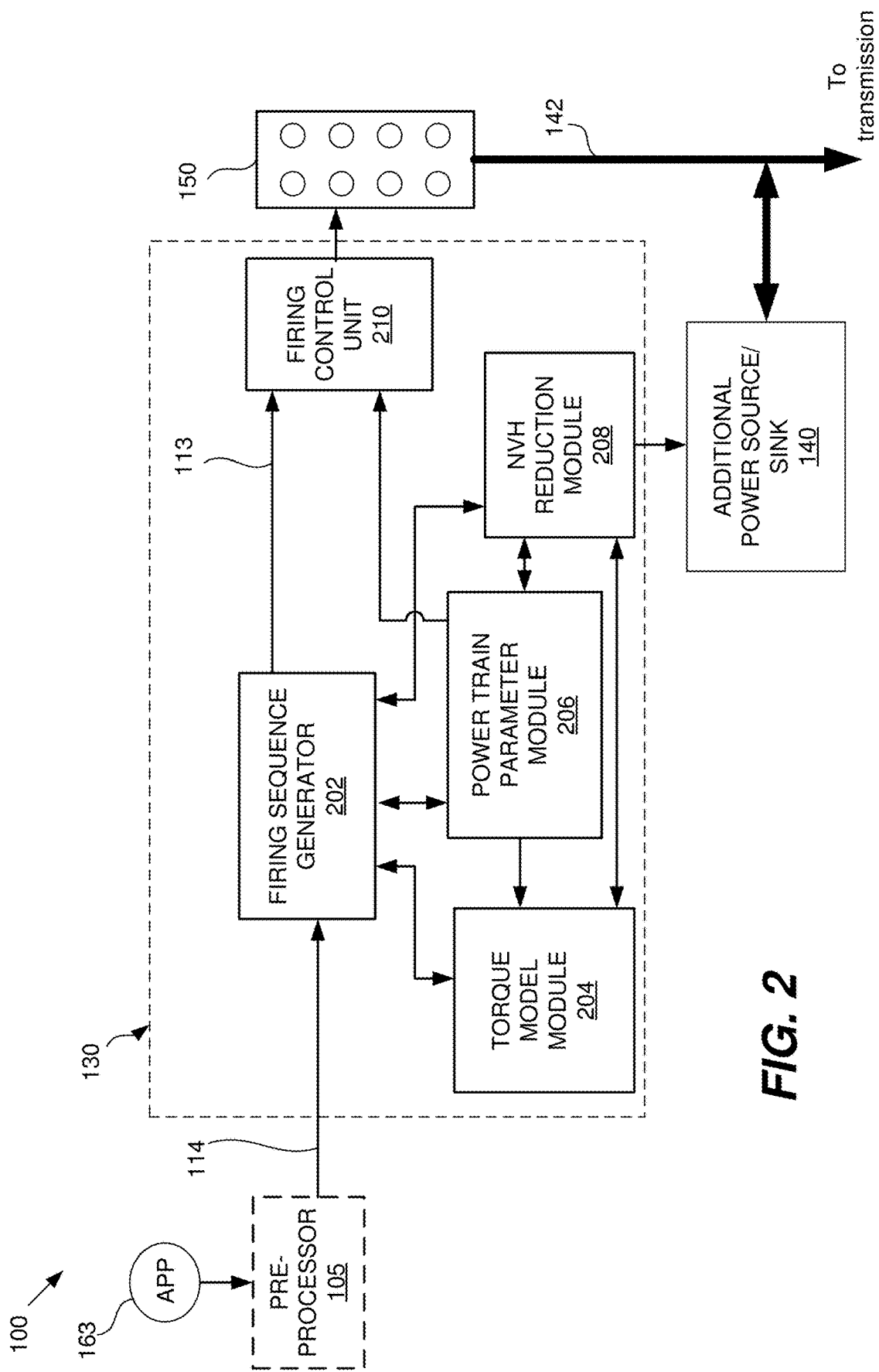
FIG. 2 is a diagrammatic illustration of a representative control architecture for a hybrid powertrain according to an embodiment of the present invention.

FIG. 2 shows a hybrid vehicle control system suitable for controlling the hybrid vehicle powertrain shown in FIG. 1 according to a particular embodiment. The vehicle control system 100 includes an engine control unit (ECU) 130, an internal combustion engine 150, a powertrain 142, and an additional power source/sink 140. The additional power source/sink may include power electronics, a motor/generator, and an energy storage device. The ECU 130 receives an input signal 114 representative of the desired engine output. The input signal 114 may be treated as a request for a desired engine output or torque. The signal 114 may be received or derived from an accelerator pedal position sensor (APP) 163 or other suitable sources, such as a cruise controller, a torque calculator, etc. An optional preprocessor 105 may modify the accelerator pedal signal prior to delivery to the engine controller 130. However, it should be appreciated that in other implementations, the accelerator pedal position sensor may communicate directly with the engine controller 130.

The ECU 130 may include a firing sequence generator 202, a torque model module 204, a power train parameter module 206, a firing control unit 210, and an NVH reduction module 208. These units and modules communicate with each other and work cooperatively to control the vehicle. The firing sequence generator 202 determines the sequence of skips and fires of the cylinders of engine 150. The firing sequence may be generated based on a firing fraction and an output of a delta-sigma converter or may be generated in any appropriate manner such as described in U.S. Pat. Nos. 8,099,224, 9,086,020, and 9,200,587, which are incorporated herein by reference in their entirety. In operation the firing sequence generator may investigate the fuel efficiency associated with various firing sequences and chose the firing sequence that offers optimal fuel economy while meeting the torque request. In some cases the powertrain torque may be supplemented or reduced by the power source/sink 140. The output of the firing sequence generator is a drive pulse signal 113 that may consist of a bit stream, in which each 0 indicates a skip and each 1 indicates a fire for an associated cylinder firing opportunity thereby defining a firing sequence. The firing decision associated with any firing opportunity is generated in advance of the firing opportunity to provide adequate time for the firing control unit 210 to correctly configure the engine 150, for example, deactivate a cylinder intake valve on a skipped firing opportunity. The torque model module 204 determines an estimated torque based on the firing sequence and power train parameters determined by the powertrain parameter module 206. These power train parameters may include, but are not limited to, intake manifold absolute pressure (MAP), cam phase angle, spark timing, exhaust gas recirculation level, and engine speed. The power train parameter module 206 may direct the firing control unit 210 to set selected power train parameters appropriately to ensure that the actual powertrain output substantially equals the requested output. The firing control unit 210 may also actuate the cylinder firings. The NVH reduction module 208 may use the output of the torque model module 204 to determine an NVH associated with any particular firing sequence and set of power train parameters. In certain cases the NVH reduction module 208 may direct additional power source/sink 140 to add or subtract torque from the powertrain 142. It should be appreciated that the various modules depicted in FIG. 2 may be combined or configured in a different manner without impacting the overall functionality of the vehicle control system 100.

Torque Profile

In order to determine whether it is necessary to supply a smoothing torque, and what that smoothing torque should be, it is advantageous to estimate the overall torque profile of the internal combustion engine. This estimate must be done in an accurate, computationally efficient manner so that the engine torque profile can be predicted in real time. The predicted torque profile may then be used to determine what, if any, smoothing torque is required.

In various approaches, the above smoothing torque may be applied selectively. That is, many firing fractions and firing sequences deliver an engine torque profile with acceptable levels of NVH, and thus the smoothing torque need not be applied in those circumstances. In other circumstances, a firing fraction or firing sequence may generate undesirable levels of NVH. In these cases a smoothing torque may be applied to reduce NVH to an acceptable level. In other cases a different firing fraction or firing sequence may be used that has acceptable NVH characteristics. A smoothing torque may optionally be used with this firing fraction or sequence. In various embodiments, the smoothing torque system is arranged to analyze the energy costs of the available options and select the most fuel efficient approach that also brings NVH to acceptable levels.

A single cylinder, normalized torque profile can be used to model the overall torque profile of a skip fire controlled internal combustion engine. Normalized profiles for fired and skipped cylinders may be recorded in a look up table. Tables can be generated for various levels of intake manifold absolute pressure (MAP), such as MAP increments of 10 kPa. Intermediate values may be determined by interpolation from these tables. An estimated torque profile for each cylinder can then be determined based on scaling and shifting the normalized torque by factors such as spark and cam phase angle, which controls the opening and closing times of the intake and/or exhaust valves. Different normalized profiles can be used for fired and skipped cylinders. When different firing levels are used, the different firing levels can be modeled differently by beginning with different normalized profiles for each different firing level and/or by scaling and shifting differently based on different spark and cam settings used. The estimated torque profile for all engine cylinders can be summed with the appropriate phasing to obtain the overall engine torque profile. The method described herein can be used to determine the engine torque with a resolution of 0.5° of crank angle, although as described below, courser resolution can often be used to reduce computational time without significantly impacting model accuracy.

Figure 3A:
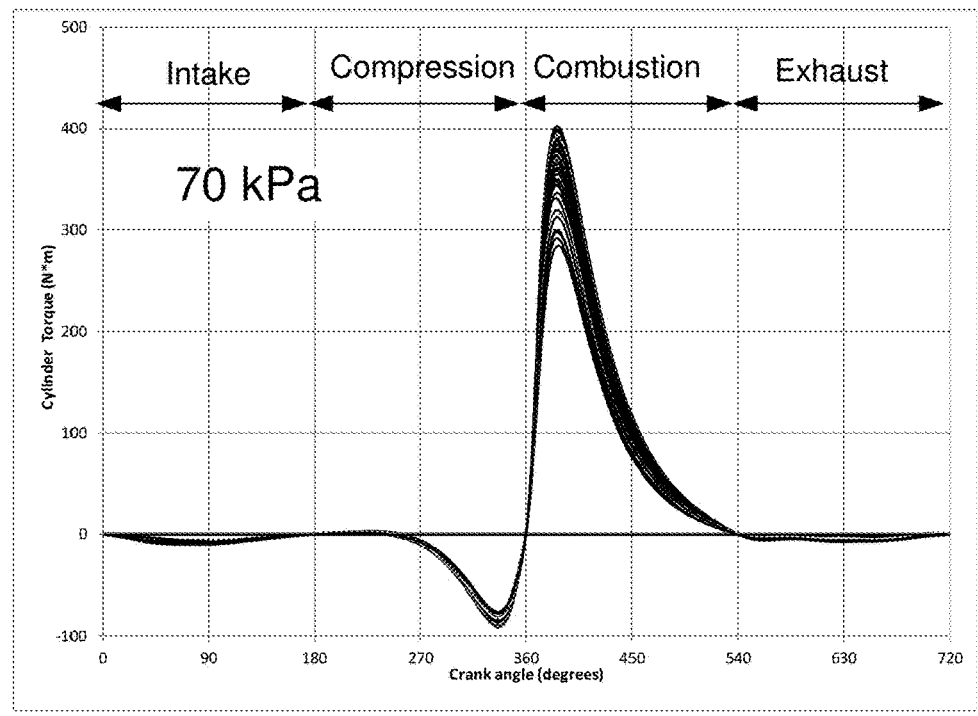
FIGS. 3A and 3B show a cylinder torque profile versus crank angle for multiple firings at different MAP values.
Figure 3B:
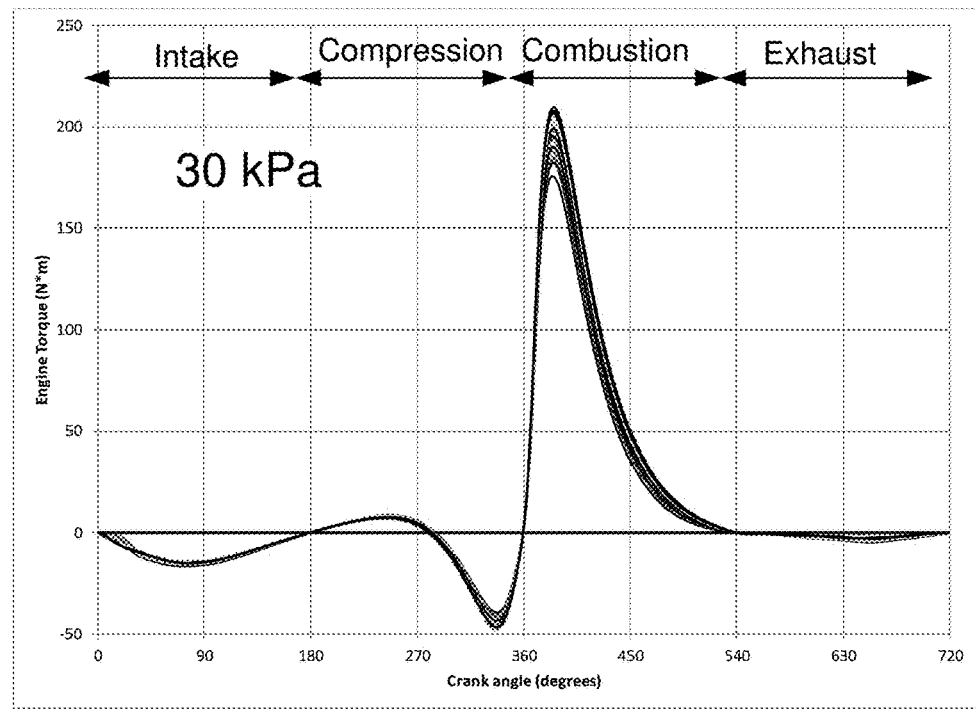

FIGS. 3A and 3B shows a torque profile associated with two different MAP values for an engine operating over a range of speeds. FIG. 3A is for an average MAP of 70 kPa and FIG. 3B is for an average MAP of 40 kPa. In both cases the vertical scale is torque and the horizontal scale is engine crank angle. Both graphs are for a fired cylinder. The figures show the torque profile in increments of 0.5° of crank angle. The various individual cycle profiles shown represent a range of engine speeds and cam angles. Spark timing has been adjusted for optimum fuel efficiency in all cases.

FIGS. 3A and 3B depict the cylinder torque profile for a 4-stroke engine. Such an engine completes an engine cycle in 720° of crank rotation. An engine cycle can be divided into four phases or strokes, intake, compression, combustion (power), and exhaust. Each stroke extends over 180° of crank angle rotation. The stroke transitions correspond to successive top dead center (TDC) and bottom dead center (BDC) piston positions. The torque here is zero, since the lever arm on the crankshaft is zero at TDC and BDC.

Inspection of FIGS. 3A and 3B shows that the maximum torque generated in the combustion stroke is significantly higher at 70 kPa compared to 30 kPa, since more air and fuel are inducted into the cylinder at higher MAP valves. Also, the pumping losses, denoted by the negative torque regions in the intake stroke are larger at the smaller MAP value. Skip fire engine operation tends to operate at higher MAP values to minimize these pumping losses and thereby improve fuel economy.

Figure 4A:
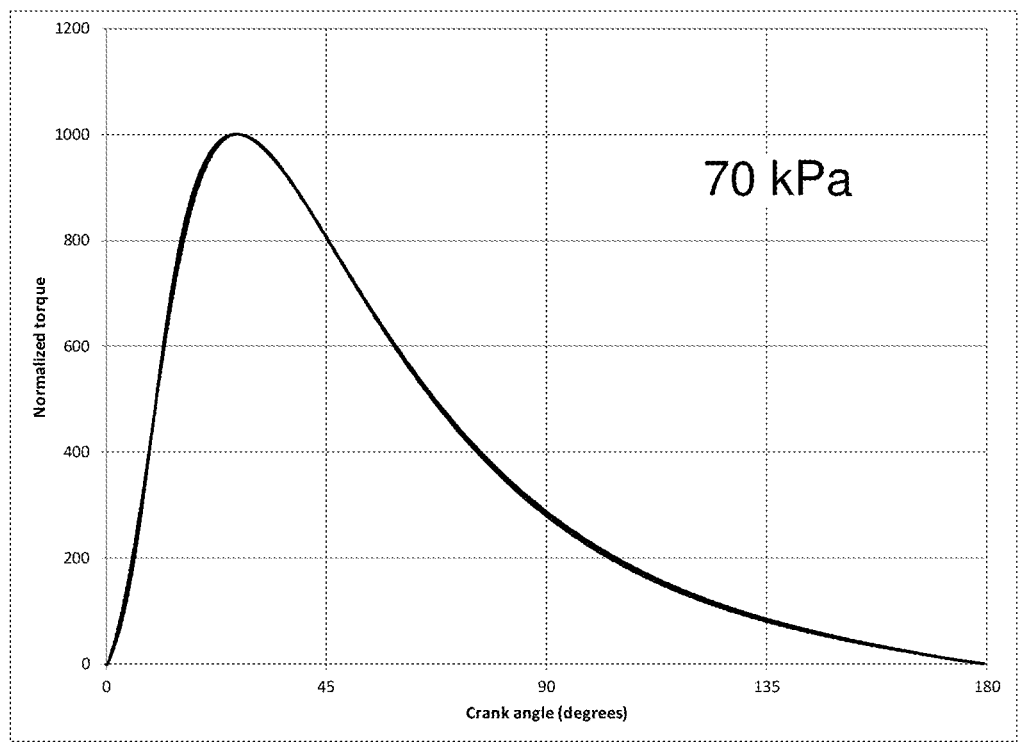
FIGS. 4A and 4B show a normalized torque profile versus crank angle for a combustion stroke at different MAP values according to an embodiment of the present invention.
Figure 4B:
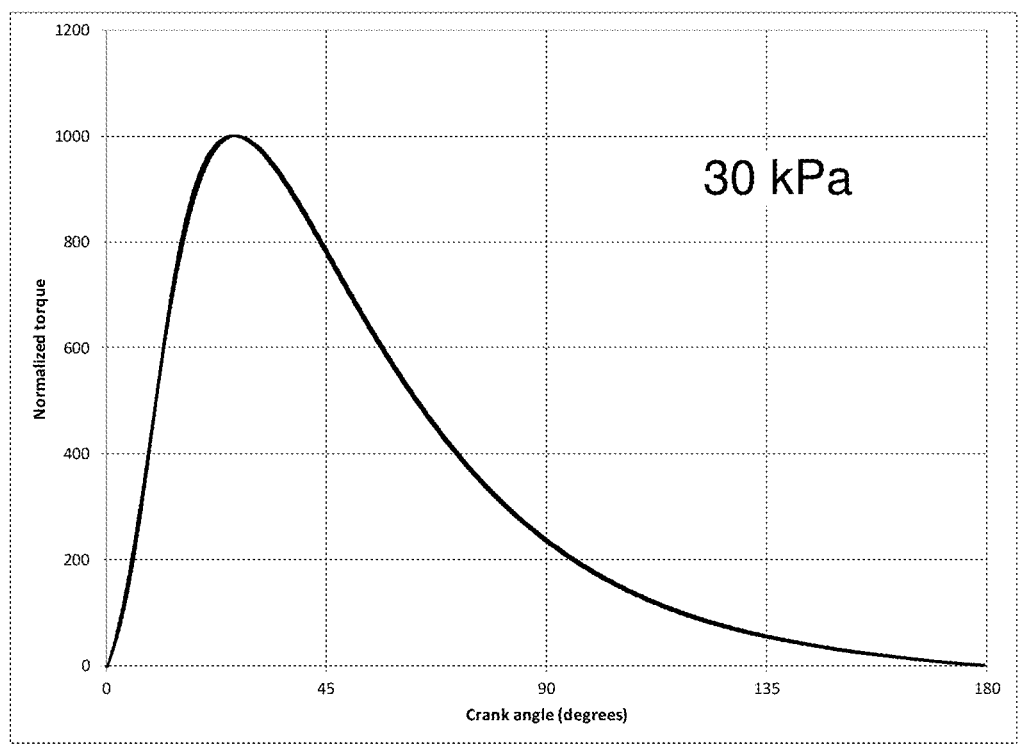
Figure 5A:
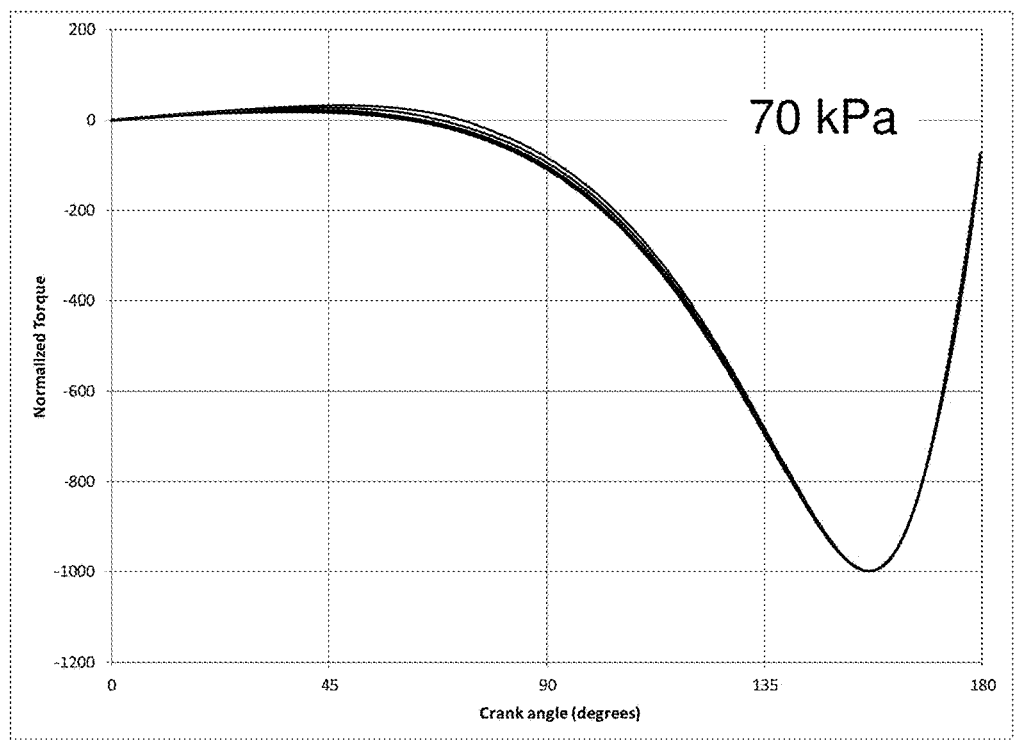
FIGS. 5A and 5B show a normalized torque profile versus crank angle for a compression stroke at different MAP values according to an embodiment of the present invention.
Figure 5B:
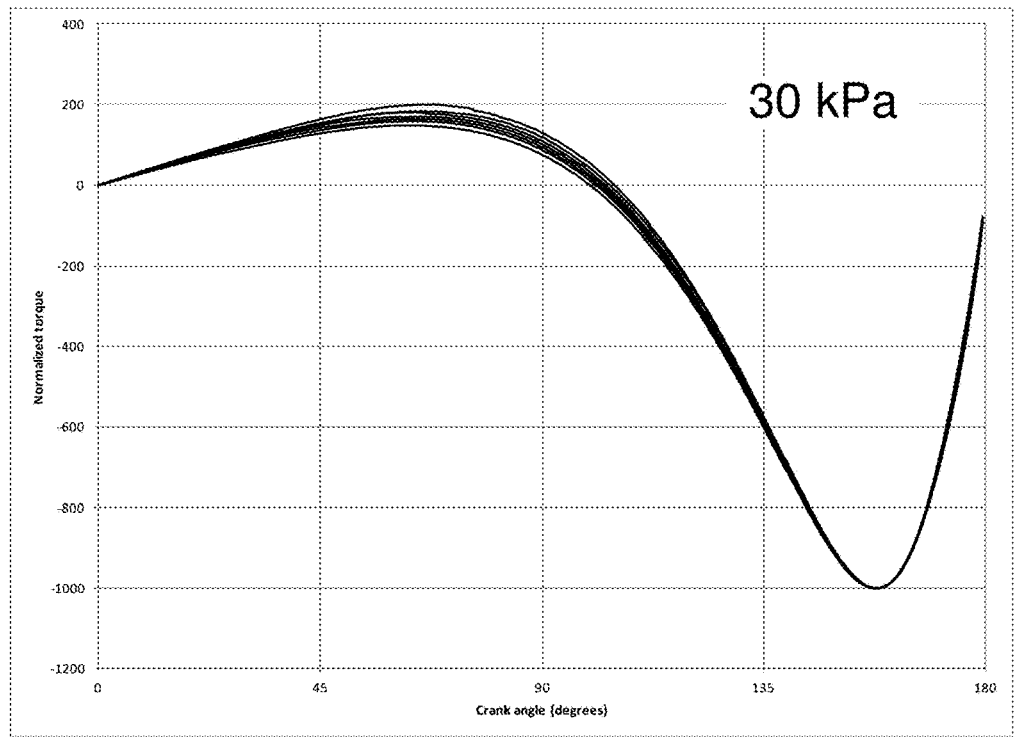

The torque profiles at each MAP and cam angle may be normalized. FIGS. 4A and 4B show such a normalized torque profile for the combustion stroke of an engine cycle with a 30° cam angle and for an average MAP of 70 kPa and 40 kPa, respectively. In these figures the vertical axis is normalized torque and the horizontal axis is crank angle. An important, unexpected observation is that by normalizing the torque profiles to the highest instantaneous torque, all the normalized torque profiles associated with each firing are substantially identical for all engine speeds. FIGS. 5A and 5B show such a normalized torque profile for the compression stroke of an engine cycle for a 30° cam angle and an average MAP of 70 kPa and 40 kPa. In this figure the vertical axis is normalized torque and the horizontal axis is crank angle. Again all the individual torque profiles have substantially identical normalized torque profiles. Similar normalized profiles can be generated for the intake and exhaust strokes of a fired cylinder.

Likewise, similar profiles can be generated for a skipped cylinder. A skipped cylinder has no power producing combustion or high temperature exhaust gases. As such, the "intake" and "combustion" stroke may have generally similar profiles when low pressure gas springs are used, as are the "compression" and "exhaust" strokes. The nature of the torque profile during a skipped firing opportunity will vary depending on valve motion during the skipped opportunity. A skipped cylinder may be deactivated, where either one or both the intake and exhaust valves stay closed during an engine cycle, so that no air is pumped through the cylinder. If both valves are closed during the cycle, the hot exhaust gases may be trapped in the cylinder or the hot exhaust gases may be released prior to closing the valves. These situations may be referred to as forming a "low pressure" spring (venting exhaust gases prior to cylinder deactivation) or a "high pressure" spring (trapping exhaust gases by deactivating the exhaust valve prior to the exhaust of a prior firing). These cases will have different torque profiles that can be modeled. In some cases, a skipped cylinder may not deactivate the valves and may pump air through the cylinder. Again this case can be modeled as well. To aid in understanding the current invention the following graphs and description will assume that a skipped cylinder is operating in a "low pressure" spring mode, but this is not a requirement.

Figure 6:
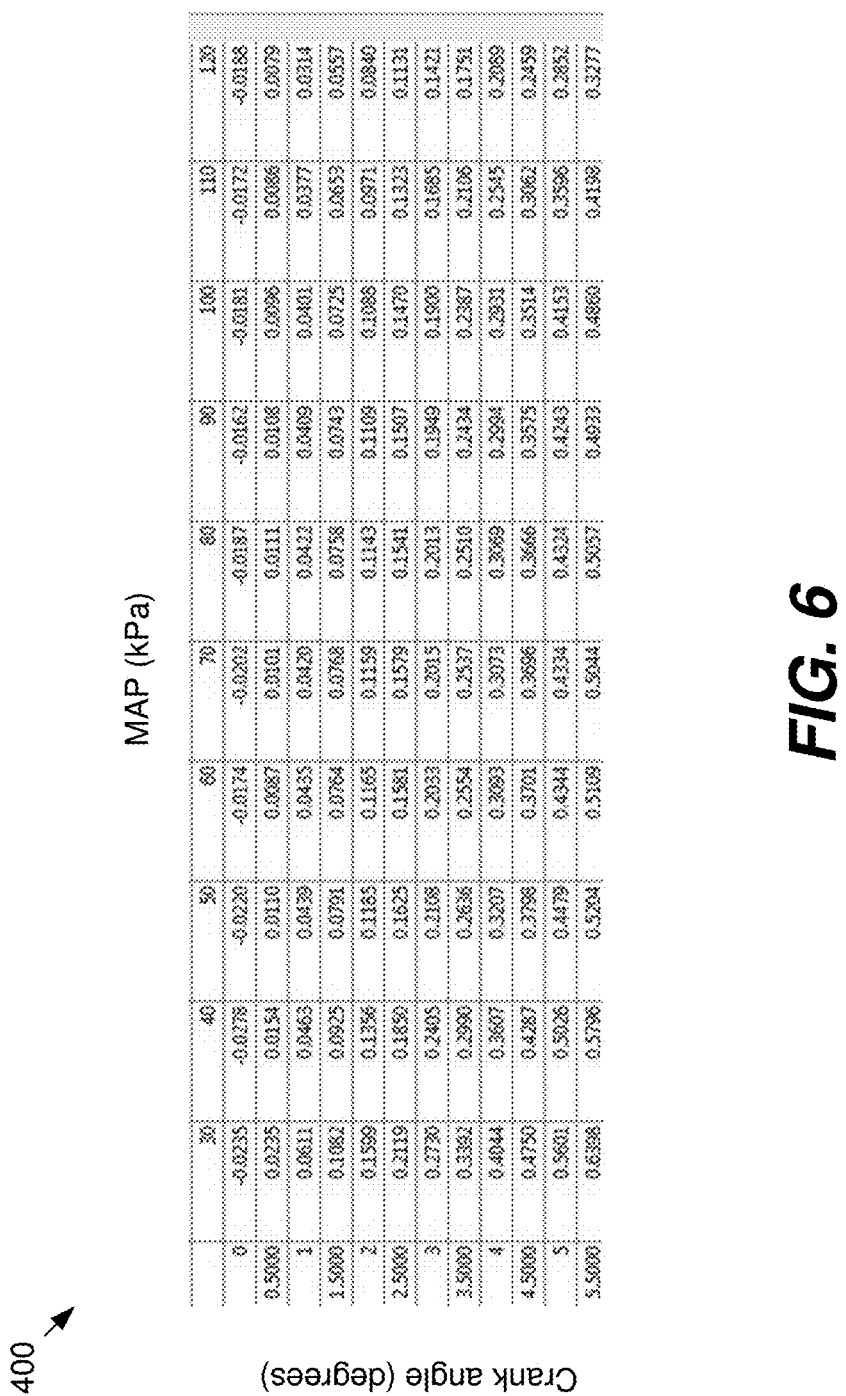
FIG. 6 shows an exemplary table showing values for the normalized torque profile for different values of MAP according to an embodiment of the present invention.

FIG. 6 shows table 400, which illustrates profiles similar to those shown in FIGS. 4A, 4B, 5A and 5B in a table format. In table 400 the rows correspond to crank angle and the columns correspond to different MAP values. The columns are normalized in the tables so that the profiles associated with each MAP value cover the same area, although different types of normalizations may be used. A separate table may be constructed for each engine stroke, i.e. intake, compression, combustion (power), and exhaust of an activated cylinder. Likewise a separate table may be constructed for the two different crankshaft rotations of a skipped engine cycle, i.e. the intake/compression rotation and the compression/exhaust rotation. Separate tables for each stroke or crankshaft rotation are useful, since depending on the engine operating conditions the scaling factor may be different between the different strokes in any given engine cycle.

Figure 7:
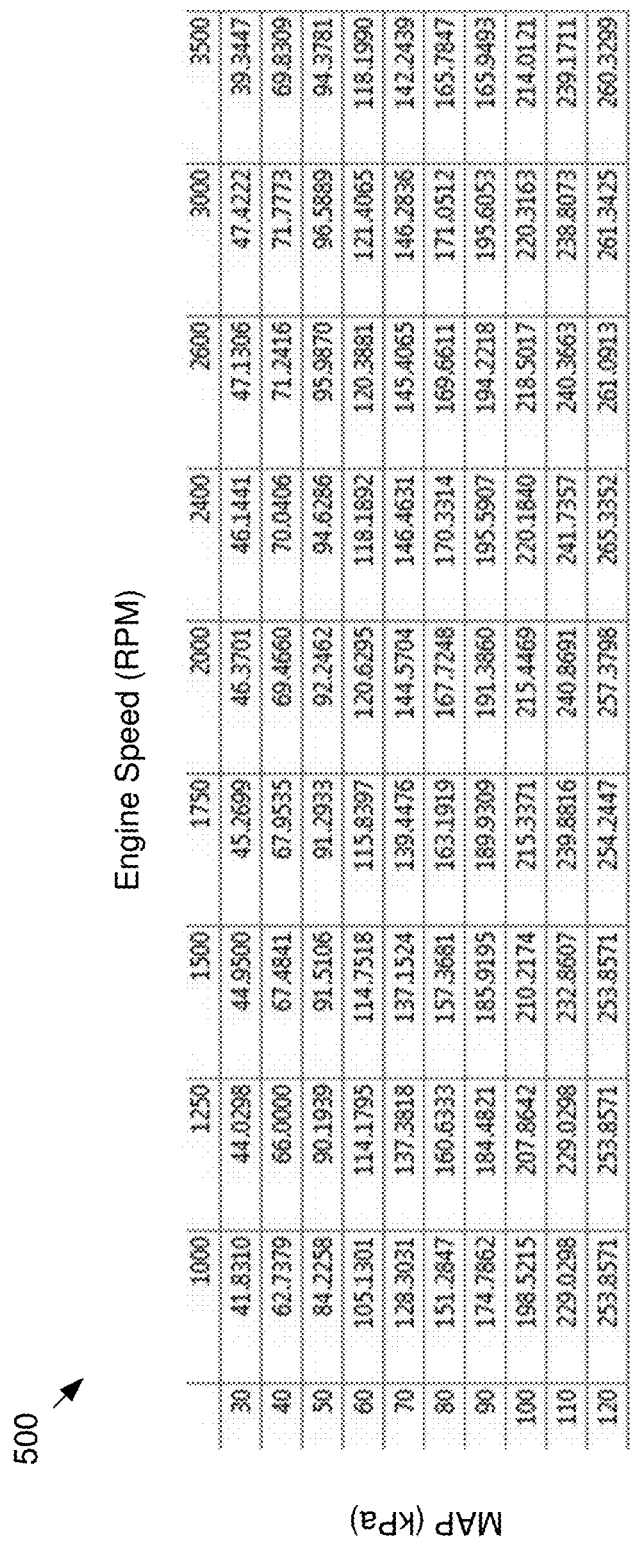
FIG. 7 shows an exemplary table showing the torque scaling factor for different values of MAP and engine speed according to an embodiment of the present invention.

Since the normalized torque profile associated with any given firing or skip is known, an estimated torque profile associated with each firing opportunity can be determined by scaling the normalized torque profile by the appropriate scaling factors. FIG. 7 shows a portion of an exemplary table 500 for scaling a normalized torque profile. The table entries are proportional to the total torque produced in a stroke for a given MAP (rows in the table) and average engine speed (columns in the table). The average engine speed in vehicle applications is known on a real time basis based on vehicle sensors that monitor the engine speed. The table shown in FIG. 5 is for a cam phase angle of 30°. Other similar tables may be constructed for other cam phase angles. In engines using dual cams, different tables may use different combinations of intake and exhaust valve timing.

The impact of spark timing on the torque profile may be handled in different ways. One method would be to construct tables similar to that of tables 400 and 500 for different values of spark timing. It is likely that only a table for the combustion stroke would be necessary, since spark timing will typically have relatively little impact on the other engine strokes. An alternative method of handling spark timing would be to generate a spark timing multiplier, which can be multiplied to the values in table 500 to adjust for the spark timing. In some embodiments, the impact of varying cam phase angle may be incorporated in the torque model by use of a simple multiplier, rather than constructing alternative tables 400 and 500 for different cam phase angles.

An alternative method of including spark timing is to represent actual torque profiles for various spark timings, i.e. construct a set of tables 400 similar to those shown in FIG. 6, for sets of cam and spark timing. Then a simple multiplication step between the normalized torque profile of table 400 (FIG. 6) and scaling factor of table 500 (FIG. 7) would be all that is required to generate the actual torque profile.

Figure 8:
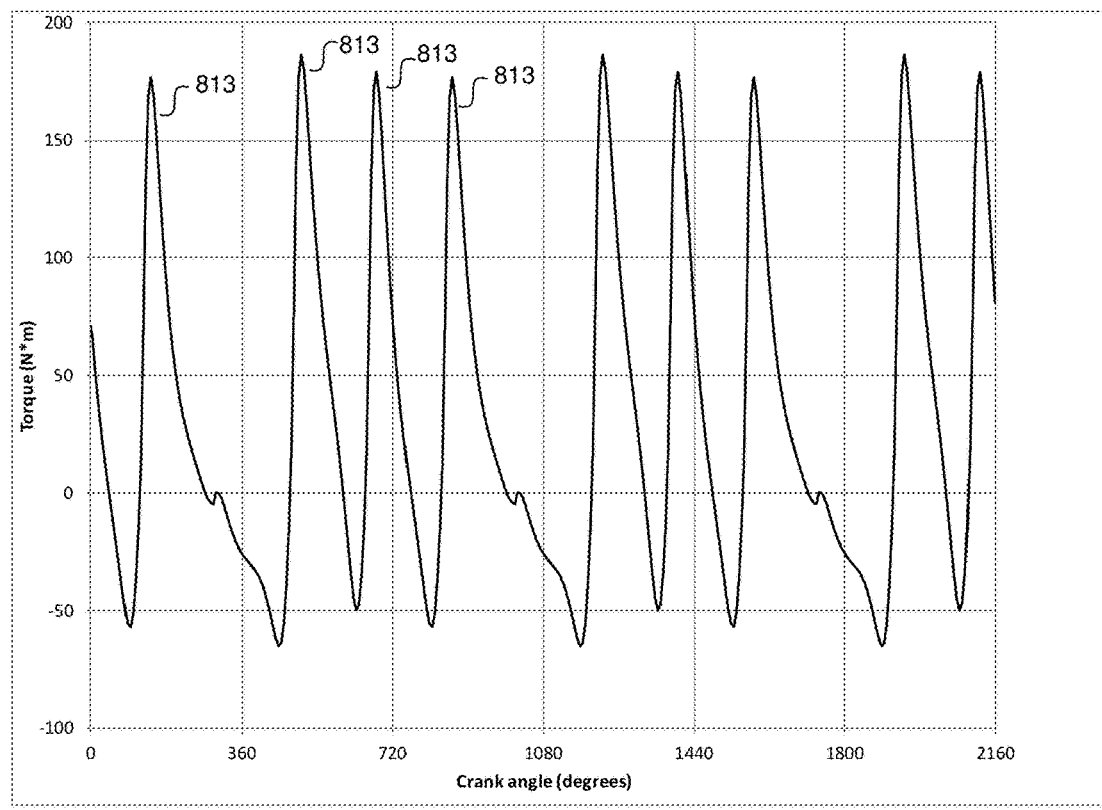
FIG. 8 shows an exemplary torque profile versus crank angle at an average engine speed of 1500 rpm and firing fraction of ¾ for a 4 cylinder engine according to an embodiment of the present invention.

Multiplication of the normalized torque profile of table 400 by the appropriate scaling factor of table 500 provides a real time estimate of the torque profile in degrees of crank angle for any given cylinder. Once the estimated torque profile associated with each cylinder has been determined, it is a simple matter to simply sum the individual cylinder torque profiles. The cylinder profiles will be offset in crank angle and thus time. For a 4 cylinder, 4 stroke engine the cylinder firings will be offset by 180° of crank angle. The sum of successive firings and skips associated with all the cylinders is the engine torque profile. FIG. 8 shows an example of such an engine torque profile for a four cylinder, 4-stroke engine operating at an average engine speed of 1500 rpm at a firing fraction of ¾. The vertical axis is total net torque from all cylinders and the horizontal axis is crank angle. In this example the firing pattern repeats every 720°. There are three engine torque spikes 813 every 720°, which are associated with the three cylinders that fire per engine cycle. Each of the torque spikes is relatively short in duration. The skipped firing opportunity shows a torque dip. In this example, cylinder load is approximately 65% of its maximum value. Often operating at about 65% of the maximum cylinder load corresponds minimizing the brake specific fuel consumption (BSFC). Over an engine cycle the maximum instantaneous delivered torque is more than 175 N*m, which may yield unacceptable NVH performance. Without the addition of a smoothing torque, a less fuel efficient firing fraction may have to be selected to provide the requested torque.

Scaling Multipliers Based on Firing History

In some embodiments, one or more additional multipliers based on the firing history may be used to further scale the normalized torque profile model to more accurately the delivered torque. These multipliers can be based on the firing history of the particular cylinder and/or the firing history of the immediately preceding engine firing opportunities (the firing sequence). During skip fire operation of an engine, the amount of torque provided by any particular firing will vary as a function of both (a) the firing history of the particular cylinder; and (b) the firing history of the immediately preceding engine firing opportunities. Generally, when other things are equal, a particular cylinder that is fired after it was skipped in its previous working cycle will generate more torque then when that same cylinder is fired after it was fired in its previous working cycle. This is due in part due to differences between the valve actuation schemes between a fired working cycle that follows a skipped working cycle vs. a fired working cycle that follows another fired working cycles. More particularly, when a fired working cycle follows another fired working cycle, the exhaust valve opening from the previous working cycle will typically overlap with the intake valve opening in the following working cycle. This causes a different amount of air to be introduced to the cylinder as compared to a circumstance in which the exhaust valve opening does not overlap with the intake valve opening as typically occurs when a fired working cycle follows a skipped working cycle in the same cylinder. Another factor that affects the air charge is the cooling of the cylinder which allows more air (and correspondingly, fuel) to be introduced to the cylinder fired. When the cylinder was skipped in its two previous firing opportunities, even more cooling can occur and the air charge (and thus the cylinder torque output) may further increase accordingly. With all other parameters being equal, the torque output for different firing opportunities of the same cylinder can vary by more than 10% based on that particular cylinder's firing history. Typically, the skip/fire status of the cylinder's immediately preceding working cycle has the most significant impact on the torque output of a particular cylinder during a particular working cycle—however, the effects can be seen based on the skip/fire status of several previous working cycles.

Similarly, the overall engine cylinder firing history can also impact the output of any particular cylinder firing. Generally, when the previous cylinder in the cylinder firing order was skipped, it does not have an associated intake event. When no intake event occurs, the pressure within the intake manifold will increase somewhat—which causes more air to be introduced when an intake event occurs for the following cylinder in the cylinder firing order. The effects of intake events associated with several preceding cylinders (i.e., the engine firing history) affects the air charge somewhat like the individual cylinder firing history. Again, the torque output for different firing opportunities in an engine cycle can vary by more than 10% based on the then current engine firing history.

The effects of either or both the cylinder firing history and the engine firing history can be accounted for by using appropriate firing history based multipliers taken from firing history tables or other appropriate constructs.

By way of example, the following two tables illustrate one particular table implementation that accounts for the effects of the engine firing sequence. The first table illustrates multipliers that are based on the number of firings that will have occurred since the last skip. In this example, if the present fired cylinder is the first firing in the engine firing sequence following a skip, a torque multiplier of 1.05 is used. If the present fired cylinder is the second consecutive firing in the engine firing sequence following a skip, a torque multiplier of 1.01 is used. If the present fired cylinder is the third consecutive firing in the engine firing sequence following a skip, a torque multiplier of 0.98 is used. If the present fired cylinder is the fourth consecutive firing in the engine firing sequence following a skip or higher, a torque multiplier of 0.96 is used. It should be appreciated that this table is particularly useful when using firing fractions of greater than ½ where there is an expectation that the firing sequence generated may include multiple firings in a row.

| Number of Firings | |
|---|---|
| After skip | Multiplier |
| 1 | 1.05 |
| 2 | 1.01 |
| 3 | .98 |
| 4 | .96 |

A second table can be used to account for the effects of multiple sequential skips in the firing order immediately before the present fired cylinder. In this table the number of consecutive skips that occurred before the present firing is used as the index. In this example, if the present fired cylinder follows a single skip in the engine firing sequence, a multiplier of 0.98 is used. If the present fired cylinder follows two consecutive skips in the engine firing sequence, a multiplier of 0.99 is used. If the present fired cylinder follows three consecutive skips in the engine firing sequence, a multiplier of 1.03 is used. If the present fired cylinder follows four or more consecutive skips in the engine firing sequence, a multiplier of 1.04 is used. It should be appreciated that this table is particularly useful when using firing fractions of less than ½ where there is an expectation that the firing sequence generated may include multiple skips in a row.

| Number of Skips | |
|---|---|
| Before Firing | Multiplier |
| 1 | 0.98 |
| 2 | 0.99 |
| 3 | 1.03 |
| 4 | 1.04 |

The specific multipliers used in the aforementioned engine firing history tables will vary based on a number of engine related factors such as the intake manifold dynamics, the nature of the engine, and the characteristics of the normalized torque profile.

Separate tables may be used to determine the appropriate multiplier to account for the firing history of the cylinder itself. One such table illustrated below that is suitable for use when the fired cylinder was skipped in its previous working cycle utilizes the intake manifold pressure (MAP) and the CAM advance as its indices. In this example, when the manifold pressure is 50 kPa, and the cam advance is 0 degrees, a multiplier of 1.0 is used. If the cam advance is 10 degrees, a multiplier of 1.02 is used. If the cam advance is 30 degrees, a multiplier of 1.07 is used. If the cam advance is 60 degrees, a multiplier of 1.10 is used. Suitable values are provided for other manifold pressures as well. When the current intake manifold pressure and/or the current cam advance is between index values in the table, interpolation can be used to obtain more accurate multipliers.

| MAP | CAM Advance (degrees) | | | |
|---|---|---|---|---|
| (kPa) | 0 | 10 | 30 | 60 |
| 30 | 1 | 1.02 | 1.07 | 1.10 |
| 50 | 1 | 1.02 | 1.07 | 1.10 |
| 70 | 1 | 1.02 | 1.05 | 1.09 |

-continued

| MAP | CAM Advance (degrees) | | | |
|---|---|---|---|---|
| (kPa) | 0 | 10 | 30 | 60 |
| 90 | 1 | 1.01 | 1.03 | 1.04 |
| 110 | 1 | 1.01 | 1.02 | 1.04 |

Again, the specific multipliers used will vary based on a variety of engine related characteristics.

Transformations to the Time Domain

In some implementations, it may be desirable to transform information available in the crank angle domain to the time domain. A rough method of transforming a crank angle domain to a time domain is to simply use the average engine speed. We have:

$$\Delta t_{avg} = \Delta(\text{crankangle})/(\text{average engine speed}) \quad (\text{Eq. 1})$$

For example if the average engine speed is 1500 rpm, then 0.5° of crank angle equals approximately 0.056 msec, and the crank angle domain can be readily transformed into a time domain.

Alternatively a more precise method of transforming crank angle into time may be used. Most vehicles monitor engine speed in real time using an engine speed sensor. The sensor typically measures the time between passage of successive marks on a flywheel rotating with the engine past a fixed sensor to determine the engine speed. The mark spacing is typically 6° of crank angle. Variations in the torque supplied to the powertrain will cause variations in the engine speed, which can be measured with the engine speed sensor. For example, the torque spike associated with a cylinder firing will cause the engine/vehicle to speed up and a torque dip associated with a skipped firing opportunity will cause the engine/vehicle to slow down.

An engine controller can compare recent variations in engine torque, determined by the previously described torque model, with recently measured variations in engine speed and establish a correlation between the two. The controller may then extrapolate this relationship for the future estimated torque profile to help transform a crank angle domain into a time domain. It should be appreciated that the transformation of a crank angle domain into a time domain is not limited to the previously described methods, but any suitable method may be used.

Figure 9:
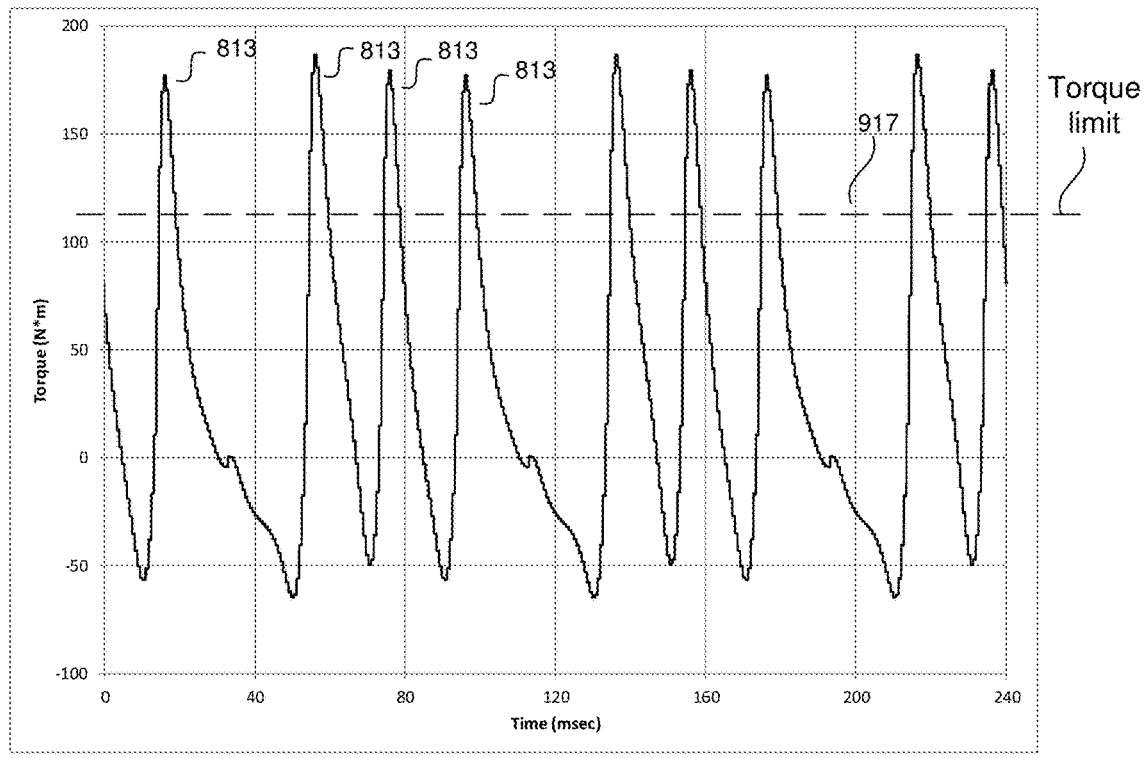
FIG. 9 shows the torque profile of FIG. 8 converted into the time domain according to an embodiment of the present invention.

FIG. 9 shows transformation of the torque profile of FIG. 8 into a time domain rather than a crank angle domain. In this figure the vertical axis is applied torque and the horizontal axis is time. The variation in the engine speed with applied torque was included in the transformation to the time base. The total elapsed time in the figure, 240 msec, corresponds to the same three engine cycles depicted in FIG. 8. Aside from transforming the horizontal axis from a crank angle domain to a time domain, FIG. 9 also depicts a courser resolution model. In this case, the torque profile was modeled in 6° crank increments rather than the previously described 0.5° increments. The result is a more stair step like torque profile. In practice we have found that 6° modeling yields sufficient resolution for engine control and diagnostic purposes. In some cases, even coarser resolution, such as 12°, 30°, or even 60° resolution may be sufficient. An advantage of using courser resolution is a reduction in memory and computational demands on the engine control unit. Note that the overall shape of the torque profile is very similar whether a crank angle domain (FIG. 8) or time domain (FIG. 9) is used, with only slight changes resulting from the transformation.

Application of Torque Profile

Knowledge of the torque profile may be advantageously used in a number of ways. In particular knowledge of the torque profile associated with upcoming firing opportunities may be used to control a smoothing torque applied in parallel to the powertrain to cancel or partially cancel variations in the overall powertrain torque. This smoothing torque may be positive (adding torque to the powertrain) or negative (subtracting torque from the powertrain) or both. The smoothing torque may be supplied by a motor/generator or some other means as previously described.

An engine controller may determine torque profiles for various firing fractions and firing sequences that deliver the requested torque. Some of these profiles may require application of a smoothing torque to provide acceptable NVH characteristics. The engine controller may then select from this set of firing fractions or firing sequence that fraction or sequence, which provides the requested torque with a minimum of fuel consumption. Generally the selected firing fraction or sequence will provide the required torque with each cylinder operating at or near its optimum efficiency.

A set of torque limit calibration tables may be constructed for different engine speeds and transmission gears. These tables compile the maximum allowed instantaneous torque for different operating conditions. If any point on the torque profile, like that shown in FIG. 9 exceeds the torque limit value in the calibration table, then that firing fraction or firing sequence is not allowed, unless a smoothing torque is applied to the vehicle's powertrain. For example, if the calibration torque limit 917 corresponding to an engine speed of 1500 rpm and the vehicle being in third gear is 110 N*m, then the torque profile depicted in FIG. 9 would not be allowed, since the maximum instantaneous significantly exceeds this value.

In addition to, or in place of, a torque limit calibration table other measures of NVH may be compiled. For example, angular jerk, the time derivative of torque, may be determined for different torque profiles. If angular jerk exceeds a certain value within a defined frequency range, the firing sequence may be not allowed or a smoothing torque may be added to reduce angular jerk. In still other embodiments, the limits may be expressed in terms of a weighted RMS vibration threshold. That is, a weighted RMS average of the instantaneous torque variations may be determined and that value may be compared to a maximum permissible weighted RMS vibration threshold.

Figure 10:
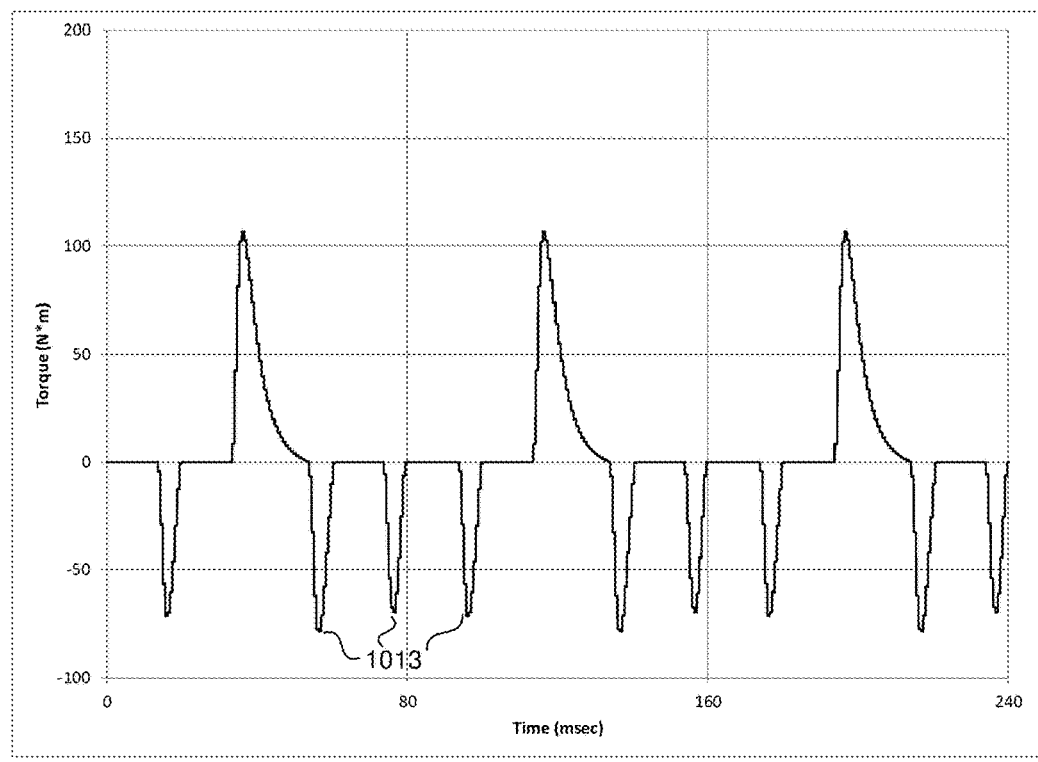
FIG. 10 shows the amount of the torque being added to the powertrain (positive value) and removed from the powertrain (negative value) by the second power source/sink of the hybrid engine according to an embodiment of the present invention.

FIG. 10 shows a smoothing torque that may be applied to the vehicle's powertrain by an additional power source/sink to reduce the maximum instantaneous torque to the calibration limit. In this figure the vertical axis is applied torque and the horizontal axis is time. A positive applied torque represents torque added to the powertrain and a negative torque represents torque removed from the powertrain. Inspection of FIG. 10 shows there are periods when there is no applied torque, periods with a negative applied torque, and periods of positive applied torque. The three successive periods of negative torque 1013 in an engine cycle overlap with the portions three torque spikes 813 corresponding to the cylinder firings of the internal combustion engine that exceed the torque limit. The one positive period of applied torque overlaps the torque trough associated with the skipped cylinder. The profile of the smoothing torque may be chosen to substantially match the shape of the torque profiles associated with a firing cylinder. This results in a more repetitive torque profile, which may be perceived as having lower NVH.

It should be appreciated that the portions of the engine torque spikes 813 that are offset by the negative torque impulses in the smoothing torque are quite short in duration, with each impulse corresponding to less than 180 degrees of crankshaft rotation, and typically less than 90 degrees of crankshaft rotation.

The amounts of positive and negative power supplied by the additional power source/sink can be controlled so that they are equal, less losses associated with the energy capture/storage/release system. Control in this manner will result in the amount of stored energy remaining relatively fixed about some appropriate level. If more stored energy is desired the amount of power drawn from the powertrain may be increased and if less stored energy is desired, the amount of power delivered to the powertrain may be increased. In some embodiments, the energy extracted from the powertrain is returned (minus losses) within the cyclic pattern, which in some cases is within the same engine cycle. More specifically, the extracted energy is preferably returned within a period equal to the degrees of crank angle associated with each firing opportunity (sometimes referred to herein as the firing opportunity period) times the denominator of the firing fraction. In an 8 cylinder engine, each firing opportunity is associated with 90 degrees of crankshaft rotation (the firing opportunity period); in a 6 cylinder engine, each firing opportunity is associated with 120 degrees of crankshaft rotation; and in a 4 cylinder engine, each firing opportunity is associated with 180 degrees of crankshaft rotation. Thus, for example, when a firing fraction having a denominator of 5 is used (e.g., $\frac{1}{5}$, $\frac{2}{5}$, $\frac{3}{5}$, $\frac{4}{5}$) in an eight cylinder engine, the energy is preferably returned within 450 degrees of crankshaft rotation (90*5)—whereas a 4 cylinder engine operating at the same firing fraction would return its energy within 900 degrees of crankshaft rotation (180*5). Of course, the actual period in which the energy will be returned will vary as a function of both the number of cylinders available and the operational firing fraction.

Figure 11:
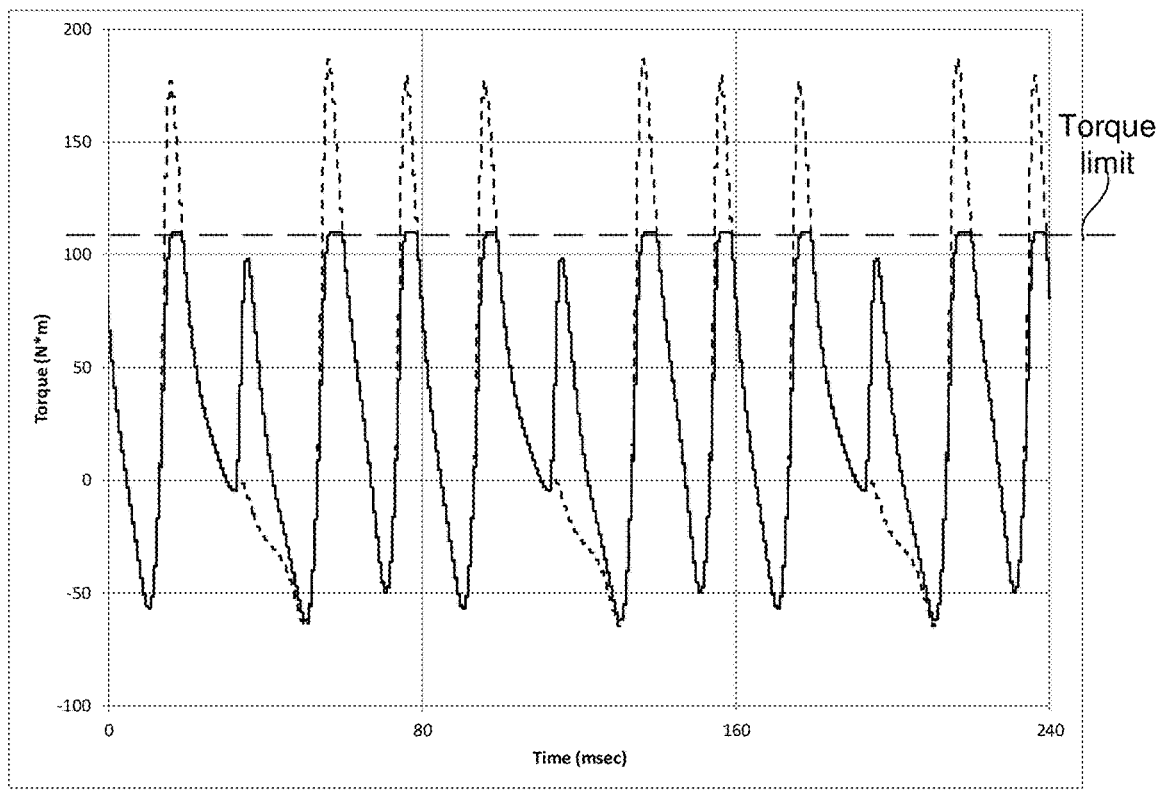
FIG. 11 shows a comparison of total power train torque between internal combustion engine only operation and operation of the engine in conjunction with a second power source according to an embodiment of the present invention.

FIG. 11 shows a comparison of the powertrain torque profile between a skip fire controlled engine without a smoothing torque and a skip fire controlled engine practicing the current invention. The dashed line depicts the torque profile of the internal combustion engine alone, without any compensation. This curve is identical to that shown in FIG. 9. The solid line depicts the torque profile of the combination of the engine with a motor/generator that can both add and remove torque from the powertrain. It is obtained by adding the smoothing torque of FIG. 10 to the internal combustion engine torque profile. Inspection of FIG. 11 shows that the instantaneous torque profile always remains below 110 N*m, which was the limit in this example. It should be appreciated that the torque limit varies with engine speed and transmission gear ratio and may also depend on other variables, such as the tip-in or tip-out rate of the accelerator pedal.

In some embodiments the predicted torque profile may be determined for a number of future firing opportunities assuming different firing fractions or firing sequences. The prediction may extend at least several firings into the future relative to the current firing opportunity. Preferably the prediction extends far enough into the future so that the engine controller can activate/deactivate the engine valves as appropriate for a fire/skip. This lead time may correspond to 3 to 9 future firing opportunities depending on the engine speed and valve actuation mechanism. In some circumstances both longer and shorter prediction periods may be used. In some embodiments the predicted torque profile may extend over the period between making a firing decision and implementing that firing decision.

The engine controller may determine the NVH and fuel consumption associated with several of the firing fractions or firing sequences that deliver the requested torque. For some firing fraction or firing sequences a smoothing torque may be required to provide acceptable NVH. The controller may then choose to operate the engine on the firing fraction or firing sequence, and optionally smoothing torque, which provides acceptable NVH while minimizing fuel consumption. In making the decision of the appropriate firing fraction or firing sequence, the engine controller may also consider other variables such as the storage level in the energy storage device associated with the auxiliary power source/sink that provides the smoothing torque as well as the conversion efficiency to and from the energy storage device. The engine controller may use additional knowledge such as whether the energy in the energy storage device is obtained from the internal combustion engine or some other power source, such as the electric power grid in a plug-in hybrid. Use of this invention will allow operation on previously disallowed firing fractions improving fuel efficiency.

Figure 12:
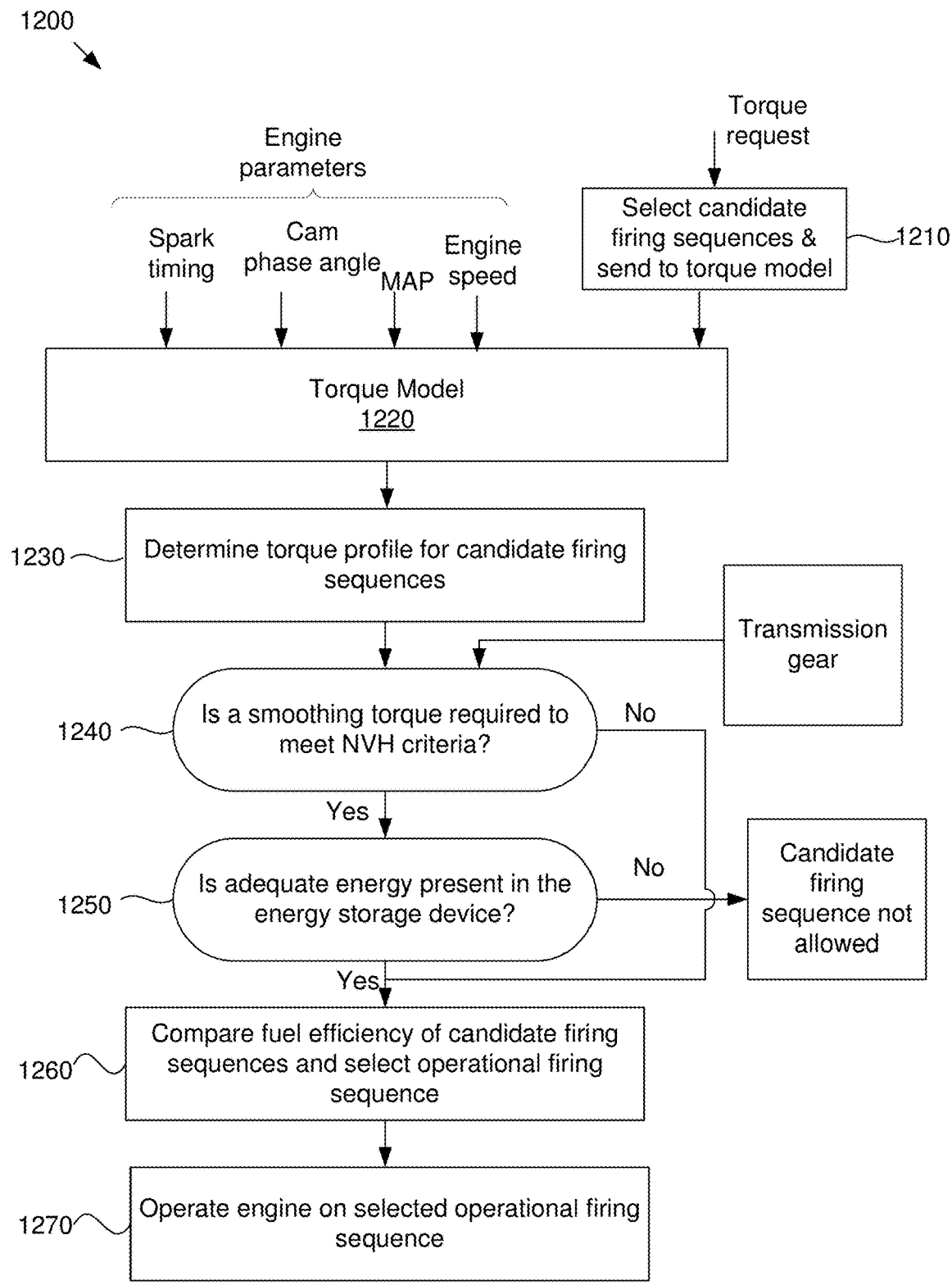
FIG. 12 is an exemplary schematic flow diagram of a method to select the most fuel efficient firing sequence according to an embodiment of the present invention.

FIG. 12 schematically illustrates a method 1200 of determining the most fuel efficient firing sequence according to an embodiment of the current invention. In this method one or more candidate firing sequences may be generated at step 1210 by the firing sequence generator 202 (FIG. 2) based on the torque request. The candidate firing sequences may be generated by any known method, such as those described in U.S. Pat. Nos. 8,099,224, 9,086,020, 9,200,587 and 9,200,575 and U.S. patent applications, Ser. Nos. 14/638,908 and 14/704,630, which are incorporated herein by reference in their entirety. These sequences are input into a torque model 1220. Also input into the torque model are various engine parameters, such as spark timing, cam phase angle, engine speed, MAP, etc. The torque model 1220 determines the torque profile for these candidate firing sequences at step 1230. An assessment may then be made at step 1240 whether a smoothing torque is necessary for the candidate firing sequence to provide an acceptable NVH level. The vehicle transmission gear setting may be used in making this assessment. If a smoothing torque is not required, the flow diagram can proceed to step 1260. If a smoothing torque is required an assessment is made at step 1250 whether there is adequate stored energy to supply the smoothing torque. If insufficient stored energy is available, that candidate firing sequence cannot be used. If sufficient energy is available, then the method proceeds to step 1260, where the fuel efficiency of the evaluated firing sequences are compared and the firing sequence providing optimum fuel efficiency is selected as the operational firing sequence. The method then proceeds to step 1270 where the engine is operate on the selected operational firing sequence. The method 1200 may be repeated for each firing opportunity to determine an optimal firing sequence.

Generating a smoothing torque to compensate for internal combustion engine torque variations is an application of the previously described torque model. During engine operation variables input to the model may include cam angle (controlling valve timing), MAP, engine speed, spark timing, crank angle, firing sequence, and firing fraction are known. The torque model can generate the instantaneous engine torque profile. Knowing the instantaneous torque at a particular crank angle, an engine controller may control the smoothing torque needed to be removed from the powertrain, for example, by a generator, or added into the powertrain, for example, by an electric motor. The electric motor/generator may be integrated into a single unit in communication with an electrical energy storage device, such as a battery or capacitor.

In the description of FIGS. 9-11 above, the torque profile and the smoothing torque are shown in the time domain. It should be appreciated that in other embodiments the smoothing torque can be determined and applied in the crank angle domain rather than converting to the time domain. This can be advantageous in some applications because the crank angle is always available to the engine controller. In such embodiments, the drawing of torque may be directed to starts at "x" degrees and ends at "y" degrees, or the addition of torque may start at "m" degree and ends at "n" degrees. As suggested above, the values of "x, y, m, n" might be arranged as a table and determined according to current RPM.

Transient Conditions

The preceding description has generally been directed at selecting the optimum combination of engine firing fraction, cylinder load, and smoothing torque during operation under nominally steady-state conditions. While this is important, a skip-fire controlled vehicle will often be switching between allowed firing fractions to deliver the required torque. A historic problem with skip fire, as well as variable displacement, engines has been unacceptable NVH generated during transitions between the number of firing cylinders i.e. changes in the firing fraction.

A smoothing torque may be applied during any transition, such as the transition associated with changing firing fraction levels. As described in co-pending U.S. patent applications Ser. Nos. 13/654,248, 14/857,371 and U.S. provisional patent application 62/296,451, which are incorporated herein by reference in their entirety, transitions between firing fraction levels may be the source of unacceptable NVH. Use a smoothing torque during those transitions may shorten the required transition time and reduce the use of fuel wasting spark retard during the transition.

One method of handling transient conditions may be referred to as harmonic cancellation. In this method a theoretically predicted engine torque profile is sent through a specially designed FIR (Finite Impulse Response) bandpass filter in the crank angle domain to extract the DSF frequency components that causes excessive vibration in real time. The engine torque profile may be determined using the previously described methods. The filtered signal can be used to create a smoothing torque via an electric motor/generator to reduce the overall powertrain torque variation. The filtering may be accomplished using a set of FIR filters that may be run in parallel, each extracting a particular frequency band in the crank angle domain. An advantage of the harmonic cancellation methods is that the same filter algorithm can be used for quantifying DSF caused vibration in both steady state and transient conditions.

Harmonic cancellation provides a real time target torque signal in a numerically efficient way that can be used in hybrid vehicle application for vibration reduction. It may be particularly applicable to micro-hybrids where the starter motor serves as the motor/generator and energy storage capacity is limited. This type of system can handle the relatively small and short duration torque requirements associated with firing fraction transitions, which typically last less than two seconds.

To apply harmonic cancellation, a torque profile may be determined using the previously described methods or any other suitable method. For example, once a "Fire" or "Skip" decision is made on a cylinder by an ECU, a torque waveform is created based on the engine parameters (such as engine speed, MAP, cam angle, etc.) in the crank domain. The total torque waveform may be assembled by combining torque waveforms of all cylinders. The total engine torque signal may then be directed through a set of FIR filters to extract the vibration energy (harmonics) caused by DSF operation. Since lower frequencies tend to have a greater NVH impact, the filter set may consist of a bandpass filter on the first and second DSF orders in the crank angle domain. Filtering in the crank angle domain means that the "frequencies" on the first and second DSF orders may be fixed with respect to engine speed, so the filter parameters may not require adjustment with engine speed. The FIR filters can have a linear phase shift, so that the delays of all filters are similar. This minimizes distortion in the filtered signal. The filtered values of the engine torque profile may be used to help generate a counter or smoothing torque in the crank angle domain. Phase in and out functions, sometimes referred to as a cross fading, may be used when switching between filters for smoothing transitions. Alternatively, filtered signal may to directed through a secondary filter to minimize discontinuities during the transient.

Figure 13:
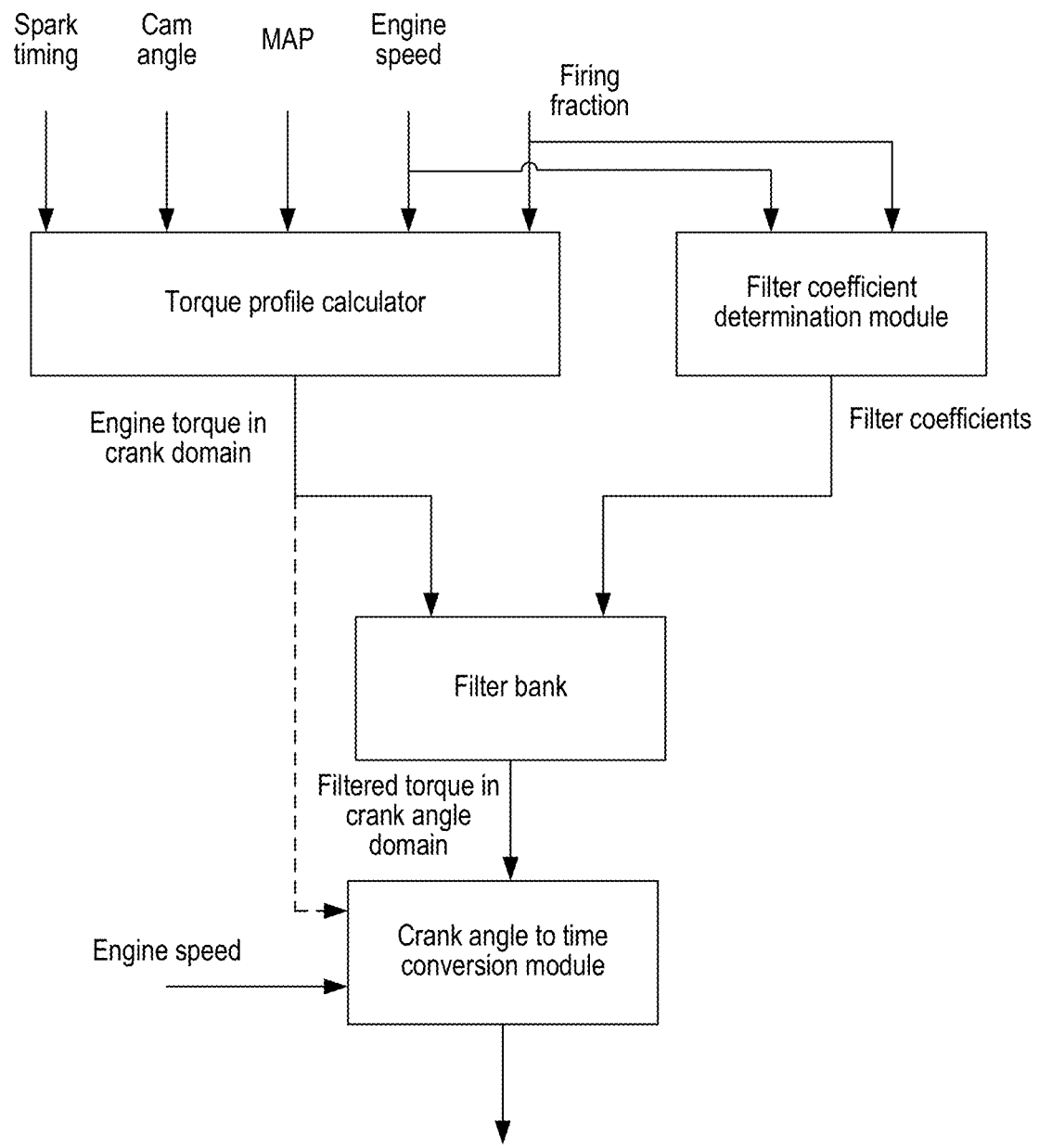
FIG. 13 is an exemplary schematic flow diagram of a harmonic cancellation method according to an embodiment of the present invention.

FIG. 13 shows an embodiment of the harmonic cancellation method. Inputs to the method include various engine parameters, such as MAP, cam phase angle, engine speed, and spark timing. A further input to the model is the firing fraction or firing sequence, which defines the pattern of upcoming skips and fires. These values are input into an engine torque model as previously described. The engine speed and firing information may be input into a filter coefficient determination module. The module determines the filter coefficients for the various DSF orders of interest, for example, the first and second order. In some cases previously used filter coefficients may be used in an upcoming calculation. The future torque profile and filter coefficients are input into a filter bank. The filter bank may be a single FIR filter or may consist of an array of FIR filters, one for each frequency band of interest. An advantage of using multiple FIR filters is that it allows application of different phase compensation to be applied to offset different phase shifts in generating a physical torque to the powertrain. The filter bank is configured to calculate an appropriate smoothing torque to cancel low order torque oscillations in the crank angle domain. The filter coefficients used in the calculation may be sent to the filter coefficient determination module for use in a subsequent calculation.

The output of the filter bank is directed to a crank angle to time domain conversion module. This module may use the engine speed and calculated future torque profile to transform the input crank domain signal to an output time domain signal. The conversion may be simply based on average engine speed or may optionally include calculated speed variations based on the calculated torque profile. Output of the time domain conversion module may be directed to the power electronics unit 26 (see FIG. 1) of the motor/generator. The power electronics unit 26 controls the motor/generator, which adds or subtracts torque from the powertrain as specified by the time domain conversion module signal. The resultant powertrain torque has been smoothed to remove torque fluctuations that would cause undesirable NVH.

Figure 14:
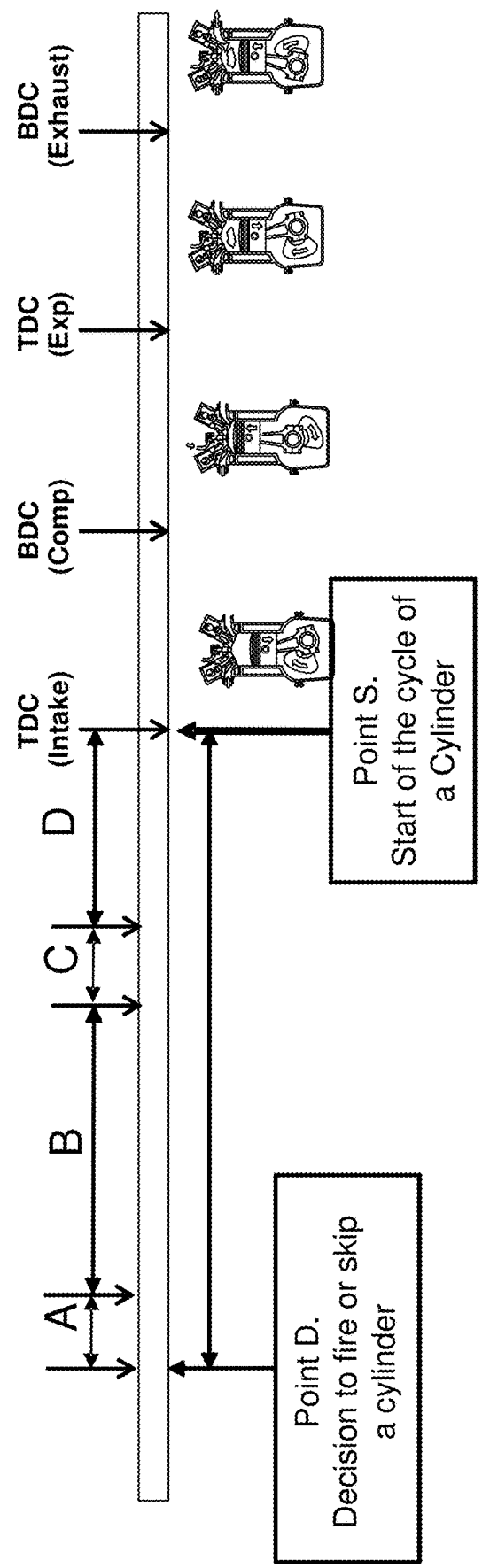
FIG. 14 shows a timeline illustrating the timing of a smoothing torque determination for a particular working cycle relative to the associated working cycle according to an embodiment of the present invention.

FIG. 14 illustrates some of the timing constraints required to successfully practice the methods described in FIG. 13. FIG. 14 shows a time line illustrating decision points, implementation windows, and engine positions associated with some embodiments of implementing the methods described in FIG. 13. At point D a decision is made whether to skip or fire a given cylinder. As described in co-pending U.S. patent application Ser. No. 14/812,370, which is incorporated herein by reference in its entirety, that decision is generally made 3 to 9 firing opportunities in advance of the implementation of that decision. Generally it is desirable to minimize the lag between making and implementation of the firing decision to improve engine responsiveness; however, delays of this magnitude are sufficient for responsive vehicle control. The start of a working cycle corresponding to the firing opportunity associated with the point D decision is denoted as point S on the time line of FIG. 14.

Once the decision to skip or fire is made, the cylinder torque profile for that firing opportunity can be determined. In FIG. 14 the time to calculate that torque profile is illustrated as window A. The filter bank has a known delay, which is represented as window B in FIG. 14. This represents the time required for the engine torque signal to be processed by the filter bank of FIG. 13. Window C in FIG. 14 represents the time required for conversion of the filtered signal output by the motor/generator to torque on the powertrain. As long as the endpoint of window C precedes point S, the start of the firing opportunity, the approach described in conjuction with FIG. 13 may be successfully implemented. Window D in FIG. 14 represents the extra, unallocated time available to complete the process if that were to become necessary.

Figure 15:
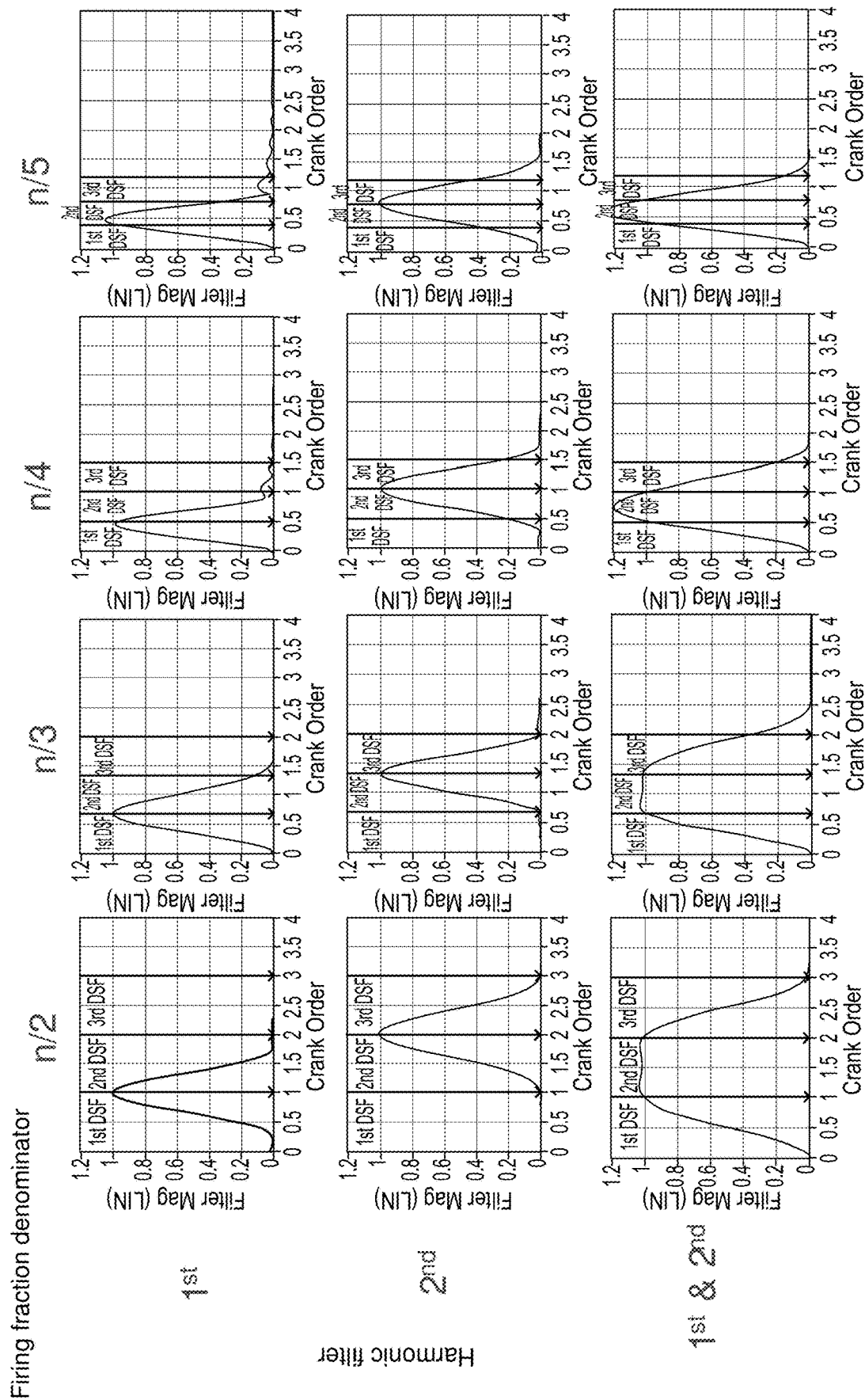
FIG. 15 shows exemplary filter characteristics according to an embodiment of the present invention.

FIG. 15 shows representative filter responses for a variety of firing fraction denominators for a 4 cylinder, 4-stroke engine. Columns in FIG. 15 correspond to various firing fractions, n/2, n/3, n/4, and n/5 where n is an integer greater than zero and less than the denominator and the numerator and denominator have no common factors. The first row in FIG. 15 represents the filter characteristics associated with the first order vibration of the engine. The horizontal axis on these graphs is a normalized frequency, expressed in terms of engine order. Here an engine order of one corresponds to one cylinder firing per engine revolution. The second row corresponds to the second order engine vibration frequency. The third row corresponds to the composite frequency response of the two filters. Inspection of FIG. 15 shows that for n/2 the first order frequency is at an engine order of 1, i.e. at a firing fraction of ½ in 4 cylinder, 4-stroke engine there is one firing per engine revolution. For the case of n/3 the first order vibration is at an engine order of ⅔, for n/4 the first order vibration is at an engine order of ½, and for n/5 the first order vibration is at engine order of ⅖. The second order frequencies are at twice the frequency of the first order. The sum of the two frequency responses are the broader peaked curves shown in the bottom row. In FIG. 15 the shape of the filter coefficients has been adjusted to so as to provide a substantially constant, linear phase shift for all filters. While the peak gain is generally near a harmonic frequency, peak gain need not correspond exactly with these frequencies. Rather the gain at the harmonic frequency can be set at a defined value, 1 in the examples shown in FIG. 15 and the filter characteristics adjusted to provide for a linear phase response.

Figure 16:
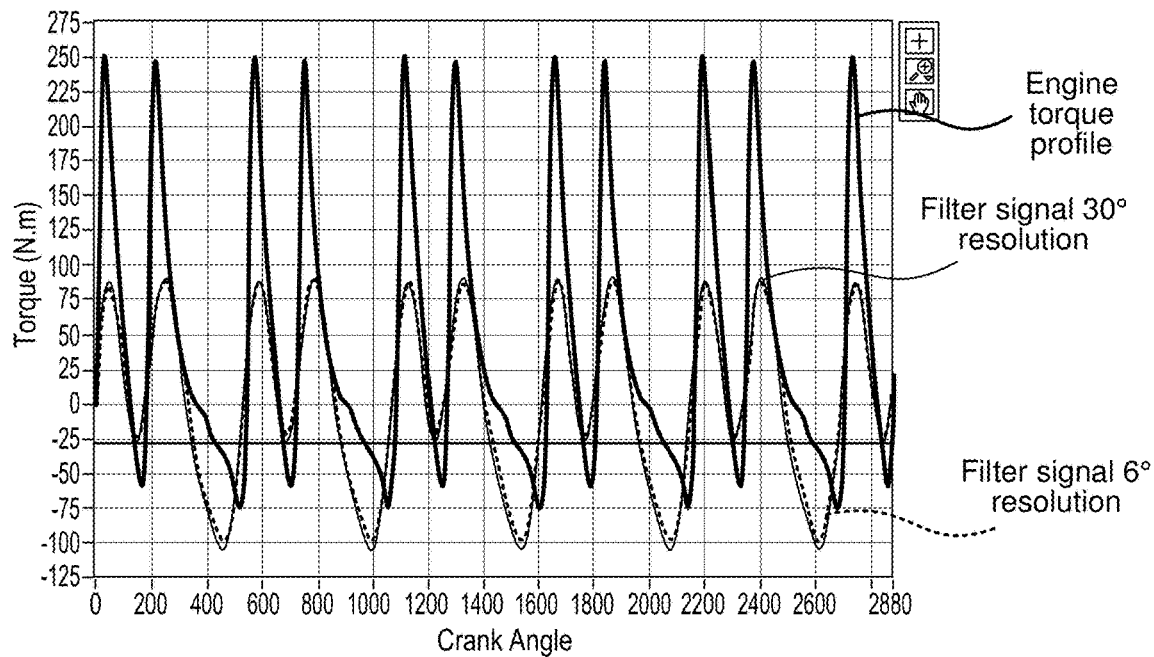
FIG. 16 shows a representative engine torque profile and resultant filtered signal appropriate for driving an additional power source/sink according to an embodiment of the present invention.

FIG. 16 shows an exemplary resultant filtered signal for a specific engine operating condition. In this case the engine is operating with cam phase angle of 40°, a speed of 1500 rpm, a MAP of 50 kPa, and a firing fraction of ⅔. The resultant engine torque profile under these conditions is shown by curve 1510 in FIG. 16. As expected curve 1510 shows two torque spikes, associated with firing cylinders, followed by a torque dip associated with a skipped cylinder. The red curve 1520 and purple curve 1530 show the filtered signal for crank angle resolutions of 1° and 30°, respectively. The curves are substantially identical, with at most a 6% difference in the filtered signal value. The relative insensitivity of the filtered signal to the filter resolution indicates that accurate results can be obtained even using course resolution. Use of course resolution dramatically decreases the computation time required to make the calculations, for example, determining the filtered signal at a resolution of 1° takes approximately 130 times longer than determining the resolution at 30°. This allows the calculations to be made on a real time basis in an ECU or some other vehicle control module with only modest processing power and speed.

Figure 17:
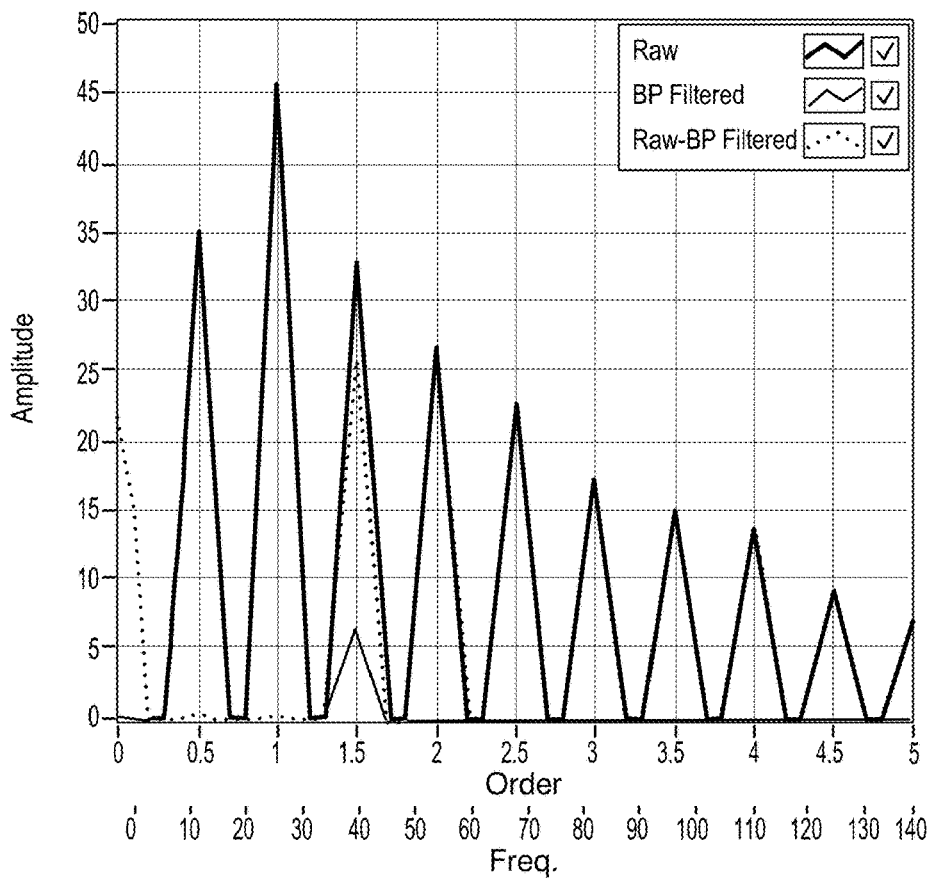
FIG. 17 shows suppression of the first and second order frequencies according to an embodiment of the present invention.

FIG. 17 shows the resultant suppression of the first and second order vibrations in the powertrain. In this figure the horizontal axis is engine order, effectively normalized frequency, and the vertical axis is the amplitude of the powertrain vibration at that frequency. The grey curve shows the response without the addition of any smoothing torque. Inspection of the figure shows significant vibration at an engine order of 0.5 and 1. The green curve shows the resultant powertrain vibrations with the addition of the smoothing torque shown generated by the filtered signal of FIG. 16. As evident in the figure, the first and second order oscillations have been almost completely eliminated.

Figures 18A, 18B, 18C, 18D:
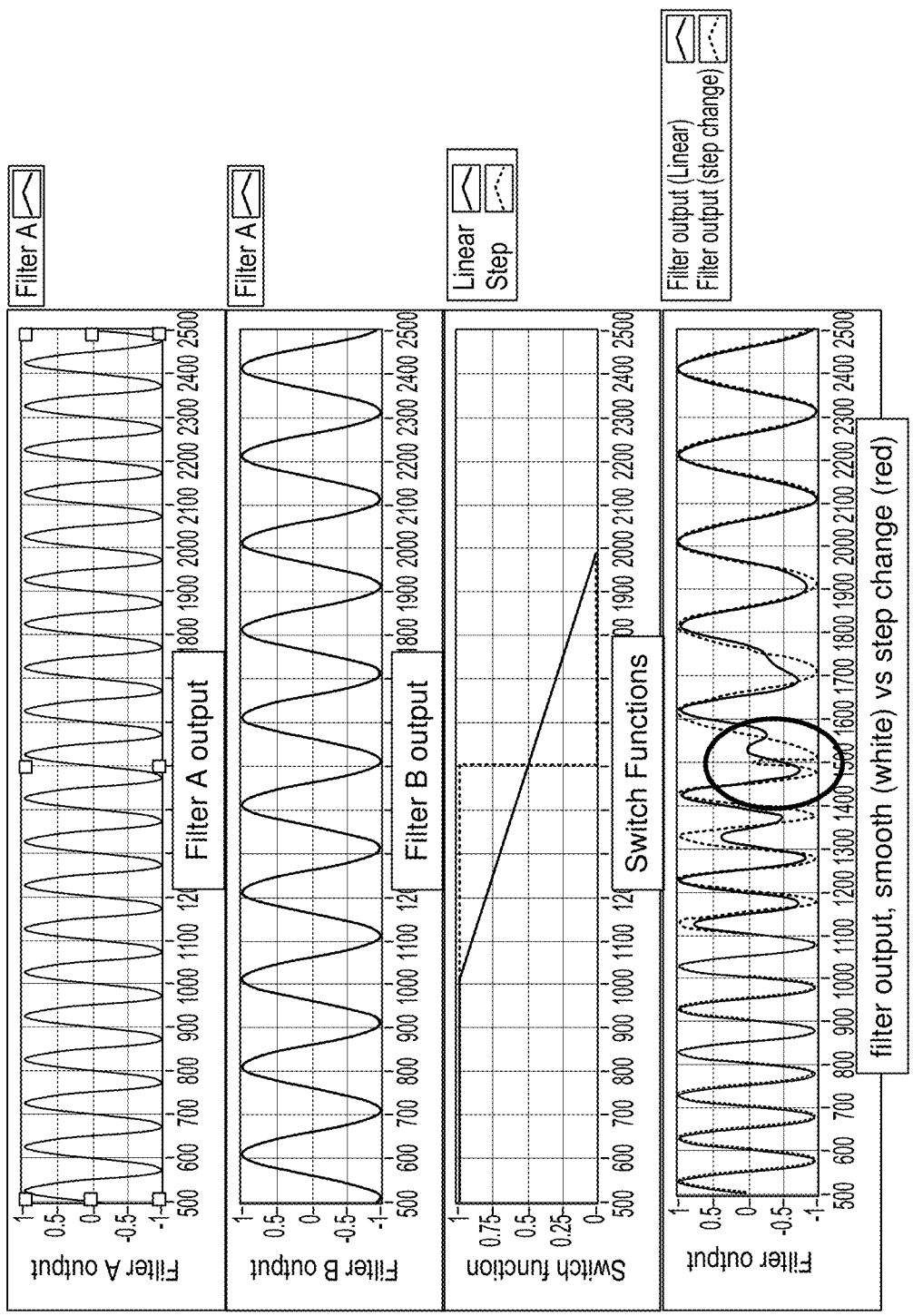
FIGS. 18A-D show an example of cross fading during a firing fraction transition according to an embodiment of the present invention.

Transient conditions may be handled using a cross fading technique as shown in FIGS. 18A-D. FIG. 18A is the filtered output of one filter bank, denoted as filter A, and FIG. 18B is the filtered output of a second filter bank, denoted as filter B. The output of the two filter banks is summed according to a switching function illustrated in FIG. 18C. FIG. 18D is a sum of the filtered outputs of filter A and filter B weighted by the switching function shown in FIG. 18C. While the switching function is shown as linear in FIG. 18C, this is not a requirement. Use of cross fading allows the filtered signal to transition seamless during a firing fraction transition.

Some of the advantages of the harmonic cancellation method are that it automatically handles transient conditions. The filtering can be independent of engine speed and cylinder load. It is energy efficient since it only damps certain frequency components, which is especially important in micro-hybrid application. Phase-in and phase-out methods allow smoothly switching the filters. Furthermore, the method has a low computation overhead for determining the filtering and gain settings and is numerically efficient, both in terms of computation and memory usage.

Exit from DCCO (Decel Cylinder Cut-Off)

One particular transient condition that can occur in a skip fire controlled engine is DCCO (decel cylinder cut-off). Operation of a dynamic skip fire controlled engine during DCCO has been described in co-pending U.S. patent application Ser. No. 15/009,533, which is incorporated herein by reference in its entirety. Use of DCCO improves fuel economy, since the cylinders are not being fueled during deceleration when no torque is being requested (e.g. when the accelerator pedal is not depressed). Use of DCCO further improves fuel economy relative to the more commonly used (DFCO) (decel fuel cut-off) because the cylinders during DCCO have been deactivated so that they do not pump air. The pumped air compromises the oxidation/reduction balance required in a 3-way catalytic converter, so its use may be limited and/or extra fuel may be required to restore the catalyst balance.

One problem with DCCO is that the intake manifold fills with air during a DCCO event. When torque is again requested the high MAP may result in high cylinder loads causing a torque surge leading to unacceptable NVH. Solutions to this problem include reducing engine efficiency by retarding spark timing and/or skipping some cylinders without deactivating the valves to help pump down the intake manifold. Both these solutions have limitations. Retarding spark reduces fuel economy. Pumping air through the engine oxidizes the catalytic converter, which may require additional fuel to restore the oxidation/reduction balance, again reducing fuel economy.

During an exit from a DCCO event MAP will generally drop from atmospheric or near atmospheric pressure to a value appropriate for delivering the requested torque for example 70 or 80 kPa. The previous described torque model may be used to determine the engine torque when exiting a DCCO event. In this case, MAP will be changing over successive engine cycle. MAP changes can be modeled using methods described in co-pending U.S. patent applications Ser. Nos. 13/794,157, 62/353,218, and 62/362,177, which are incorporated herein by reference in their entirety. Other methods of MAP estimation may be used. As the MAP drops the output per fired cylinder will generally decrease in a roughly proportional manner.

The torque surge may be cancelled or reduce by use of a smoothing torque. The smoothing torque may be chosen so that the powertrain torque gradually increases from zero, the value during DCCO, towards the requested torque level. Unlike some of the previously described cases the smoothing torque in this case will not necessarily display a regular cyclic behavior and the smoothing torque will generally be removing torque from the powertrain during the transient period associated with exiting a DCCO event. The energy associated with the removed torque may be stored in an energy storage device, such as a capacitor or battery, and used to help power the vehicle at a future time. Application of a smoothing torque from the additional power source/sink during an exit from a DCCO event improves fuel efficiency and does not impact the catalytic converter oxidation/reduction balance.

More generally this same type of control strategy may be used whenever there is a firing fraction transition from a low firing fraction to a higher firing fraction. These transitions have a tendency to create an engine torque surge, which can be mitigated by absorbing some or all of the excess torque in an energy storage device. Similarly, transitions from a high firing fraction to a low firing fraction may cause a torque dip in engine output. This dip may be partially or completely filled in using energy from the energy storage device.

Controlling Accessories to Help Manage Torque

In most of the examples given above, the smoothing torque is applied by a bidirectional energy source/sink such as an electric motor/generator that is capable of both adding torque to the powertrain and drawing torque from the powertrain, with the excess energy being stored in a storage device such as a capacitor or battery. Although electric hybrid vehicles are particularly well suited for applying the smoothing torque, similar effects can be obtained in some circumstances in non-hybrid vehicles through the active control of certain accessories. For example most non-hybrid automotive engines include an alternator. When generating electricity, the alternator puts a load on the engine. During normal driving, the alternator is often configured to generate electricity to charge the battery. The output of an alternator can be controlled by controlling the field winding current of the alternator. Thus, in some embodiments, the output of the alternator can be varied to load and unload the powertrain in a manner that effectively applies a smoothing torque to the powertrain.

When more power is needed from the engine, the alternator field current can be reduced or removed—which will cause the output of the alternator to drop thereby reducing the load on the powertrain which makes more torque available to the drivetrain. When less power is needed from the engine, alternator can be commanded to produce more power which provides a higher load on the engine. Thus, the alternator field current can be modulated in a manner that varies its load on the powertrain to offset vibration inducing torque surges. Pulse-width modulated signals are typically used to drive the alternator field current and can readily be controlled to produce higher (or lower) alternator output voltages to charge the battery and momentarily increase (or decrease) the drag load applied to the powertrain by the alternator. When the battery charge is already high and more battery charging is not desirable, devices such as the rear window heater or the front windshield heater can be turned on to absorb the electrical load. The use of the alternator in this manner is particularly effective at handling torque surges in applications such as transitioning out of DCCO operation back to skip fire operation of an engine.

Another accessory that can sometimes be used in a similar manner is an air conditioner in operating circumstances where the air conditioner is operating. Specifically, since, the precise output of an air conditioning unit is generally not critical, its output can be modulated to provide some of the described torque smoothing functions.

Other Embodiments

The embodiments described above have primarily been described in the context of smoothing the torque in conjunction with skip fire operation of an engine. However, it should be appreciated that the described techniques are equally applicable in embodiment that utilize multi-charge level or other types of firing level modulation engine operation. Furthermore, many of the described techniques can be used to improve operation during traditional variable displacement operation of an engine—including during both transitions between different displacements and during steady state operation at a particular displacement.

Another application of the torque model described above would be engine calibration. Engine calibration is much easier using this method. A calibrated table based on engine speed and firing fraction or firing sequence for each gear would indicate what operating conditions provide acceptable NVH. If the engine torque excursions exceeded the allowed torque, i.e. the output of the vibration calibration table, a smoothing torque may be added to bring the overall torque profile within acceptable levels.

The invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. For example, there are many forms of hybrid engines, parallel hybrids, series hybrids, micro hybrids, mild hybrid, full hybrids depending on the relative size of the two power sources, the storage capacity of the auxiliary energy source, and the mechanisms used to store the auxiliary energy. The invention described herein is applicable to all these types of hybrid vehicles.

In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The invention claimed is:

1. An engine controller configured to control operation of an internal combustion engine, the engine controller configured to:
   operate the internal combustion engine in a Decel Cylinder Cut-Off (DCCO) mode;
   ascertain Manifold Absolute Pressure (MAP) in an intake manifold associated with the internal combustion engine while operating in the DCCO mode;
   predict an engine torque surge when the internal combustion engine exits the DCCO mode, the engine torque surge caused at least partially by an increase in the MAP resulting from no air being pumped through any of the working chambers of the internal combustion engine while operating in the DCCO mode; and
   applying a smoothing torque to a powertrain driven by the internal combustion engine during the exit from the DCCO mode so as to at least partially counteract the predicted engine torque surge applied to the powertrain when exiting the DCCO mode.

2. The engine controller of claim 1, further configured to select the smoothing torque so that the predicted engine torque surge is either entirely cancelled or reduced.

3. The engine controller of claim 1, further configured to select the smoothing torque so as to reduce an overall torque applied to the powertrain, wherein the overall torque applied to the powertrain includes torque generated by the internal combustion engine including the torque surge less the smoothing torque.

4. The engine controller of claim 1, further configured to operate in cooperation with a source/sink, the source/sink providing the smoothing torque.

5. The engine controller of claim 1, wherein the source/sink that operates in cooperation with the controller includes one of a battery, a capacitor, an electric motor/generator, or an alternator.

6. The engine controller of claim 1, further configured to apply the smoothing torque by generating pulse-width modulated signals to control a field current of an alternator, the pulse-width modulated signals causing the alternator to generate a higher or lower voltage output that charges a battery, which in turn, increases or decreases a drag load applied to the powertrain.

7. The engine controller of claim 1, further configured to apply the smoothing torque so that a net powertrain torque does not exceed a threshold instantaneous torque during the exit of the DCCO mode.

8. The engine controller of claim 1, wherein operating the internal combustion engine in the DCCO mode further comprises deactivating all of the cylinders of the internal combustion engine and preventing air from pumping through the cylinders of the internal combustion engine.

9. The engine controller of claim 1, wherein the engine controller is a skip fire engine controller configured to selectively operate the internal combustion engine at one or more reduced effective displacements, all of which are less than full displacement of the internal combustion engine, wherein when the internal combustion is operating at one of the one or more reduced effective displacements, at least one cylinder is fired, skipped and either fired or skipped over successive working cycles.

10. The engine controller of claim 9, wherein the engine controller is a dynamic skip fire engine controller configured to dynamically make a firing decision to either fire or skip each cylinder of the internal combustion engine on either a working cycle-by-working cycle basis or on an engine cycle-by-engine cycle basis.

11. The engine controller of claim 1, wherein the engine controller is further configured to apply the smoothing torque to the powertrain so as to reduce or cancel harmonics of the internal combustion engine.

12. The engine controller of claim 11, wherein the engine controller operates in cooperation with a Finite Impulse Response (FIR) band-pass filter operation in a crankangle domain, the FIR band-pass filter extracting frequency components that cause excessive vibration while the internal combustion engine is operating at a reduced effective displacement that is less than full displacement of the internal combustion engine.

13. The engine controller of claim 1, wherein predicting an engine torque surge involves scaling a normalized torque profile that is indexed in one or more look up tables.

14. The engine controller of claim 13, wherein the one or more look up tables include a plurality of normalized cylinder torque profiles that are indexed by different increments for various levels of MAP.

15. An engine controller configured to control operation of an internal combustion engine, the engine controller configured to:
   control the internal combustion engine to selectively operate in a skip fire mode, the skip fire mode involving operating the internal combustion engine at a reduced effective displacement that is less than full displacement of the internal combustion engine by firing some cylinder firing opportunities while skipping other cylinder firing opportunities;
   control the internal combustion engine to selectively operate in a Decel Cylinder Cut-Off (DCCO) mode when no torque is requested of the internal combustion engine;
   ascertaining when operation of the internal combustion engine results in an unacceptable level of Noise, Vibration and/or Harshness (NVH) or an engine torque surge when the internal combustion engine exits the DCCO mode; and
   applying a smoothing torque to a powertrain driven by the internal combustion engine so as to counteract the unacceptable level of NVH and/or the predicted engine torque surge applied to the powertrain when exiting the DCCO mode.

16. The engine controller of claim 15, wherein the engine controller operates in cooperation with a Finite Impulse Response (FIR) band-pass filter operating in a crankangle domain, the FIR band-pass filter extracting frequency components that cause excessive vibration while the internal combustion engine is operating at a reduced effective displacement that is less than full displacement of the internal combustion engine.

17. The engine controller of claim 15, wherein predicting an engine torque surge involves scaling a normalized torque profile that is maintained in one or more look up tables and the one or more look up tables include a plurality of normalized cylinder torque profiles that are indexed by different increments for various levels of Manifold Absolute Pressure (MAP).

18. The engine controller of claim 15, further configured to select the smoothing torque so that the predicted engine torque power surge is either entirely cancelled or reduced.

19. The engine controller of claim 15, further configured to select the smoothing torque so that the NVH is reduced to below the unacceptable threshold.

20. The engine controller of claim 15, further configured to operate in cooperation with a source/sink, the source/sink providing the smoothing torque.

21. The engine controller of claim 20, wherein the source/sink that operates in cooperation with the controller includes one of a battery, a capacitor, an electric motor/generator, or an alternator.

22. The engine controller of claim 15, wherein applying the smoothing torque further comprises generating pulse-width modulated signals to control a field current of an alternator, the pulse-width modulated signals causing the alternator to generate a higher or lower voltage output that charges a battery, which in turn, increases or decreases a drag load applied to the powertrain.

23. The engine controller of claim 15, further configured to apply the smoothing torque so that a net powertrain torque does not exceed a threshold instantaneous torque during the exit of the DCCO mode.

24. The engine controller of claim 15, wherein operating the internal combustion engine in the DCCO mode further comprises deactivating all of the cylinders of the internal combustion engine and preventing air from pumping through the cylinders of the internal combustion engine.

\* \* \* \* \*